(12) United States Patent
Preusker

(10) Patent No.: US 6,357,500 B1
(45) Date of Patent: Mar. 19, 2002

(54) NONSKID DEVICE, NAMELY FOR PNEUMATIC-TIRED WHEELS OF VEHICLES ON ICE AND SNOW SURFACES

(75) Inventor: Werner Preusker, Sauldorf (DE)

(73) Assignee: Confon AG, Rheineck (CH)

( * ) Notice: Subject to any disclaimer, the term of this patent is extended or adjusted under 35 U.S.C. 154(b) by 0 days.

(21) Appl. No.: 09/393,035

(22) Filed: Sep. 9, 1999

(30) Foreign Application Priority Data

| Sep. 15, 1998 | (DE) | ................................. 298 16 502 U |
| Jun. 16, 1999 | (DE) | ................................. 299 10 534 U |
| Jun. 16, 1999 | (DE) | ................................. 299 10 533 U |
| Jul. 30, 1999 | (DE) | ................................. 299 13 258 U |

(51) Int. Cl.[7] .............................................. B60C 11/00
(52) U.S. Cl. ................... 152/225 R; 152/223; 301/41.1
(58) Field of Search .............................. 301/40.1, 41.1, 301/44.1–44.4, 46–47; 152/225 R, 226–230, 167–168, 170, 208, 209 P, 213 R, 216, 213 A, 221–224

(56) References Cited

U.S. PATENT DOCUMENTS

| 2,443,261 A | | 6/1948 | Maxwell |
| 2,610,898 A | | 9/1952 | Smith |
| 3,847,196 A | * | 11/1974 | Gomez ........................ 152/219 |
| 3,861,752 A | * | 1/1975 | Thurre et al. ............... 301/44.1 |
| 4,089,359 A | * | 5/1978 | Jones |
| 4,209,049 A | * | 6/1980 | Regensburger ............. 152/216 |
| 4,306,604 A | * | 12/1981 | Snider ........................ 301/41.1 |
| 4,405,006 A | * | 9/1983 | Preusker ..................... 152/216 |
| 4,529,023 A | * | 7/1985 | Deland .................... 152/225 R |
| 4,747,438 A | * | 5/1988 | Joung ......................... 152/228 |
| 5,223,058 A | * | 6/1993 | Preusker .................... 301/40.1 |
| 5,254,187 A | * | 10/1993 | Metraux .................. 152/213 R |
| 5,309,967 A | * | 5/1994 | Preusker ..................... 152/216 |
| 5,645,659 A | * | 7/1997 | Ivan ........................... 152/216 |

FOREIGN PATENT DOCUMENTS

| AT | 325435 | 10/1975 |
| DE | 2759899 | 8/1983 |
| DE | 8327385 | 12/1983 |
| FR | 1368348 | 6/1964 |

* cited by examiner

Primary Examiner—S. Joseph Morano
Assistant Examiner—Long Bao Nguyen
(74) Attorney, Agent, or Firm—Friedrich Kueffner

(57) ABSTRACT

For adapting a nonskid device for pneumatic-tired wheels of vehicles on ice and snow surfaces which is held at one end on the wheel of the vehicle and which shows a number of arm-type gripping element supports (50) placed on a supporting element (10), partially overlapping the tire tread, with gripping elements (50a) provided for at their free ends, which show on the outside spikes (51) or chain sections connecting respectively two gripping element supports with each other or chain strings of chain nets bearing on the tire tread (111) in the tire circumferential direction, to different tire sizes, the distance of the fixing point (55) of each gripping element support (50) with its gripping element (50a) on the surface (11) of the plate-shaped or ring-shaped supporting element (10) or of the supporting element showing another conformation or on the ring surface of the ring-shaped supporting element (10) to the tire tread on the supporting element (10) is variable, whereby the fixing point (55) for each gripping element support (50) can be fixed to the tire size after the adjustment has taken place (FIG. 5).

35 Claims, 15 Drawing Sheets

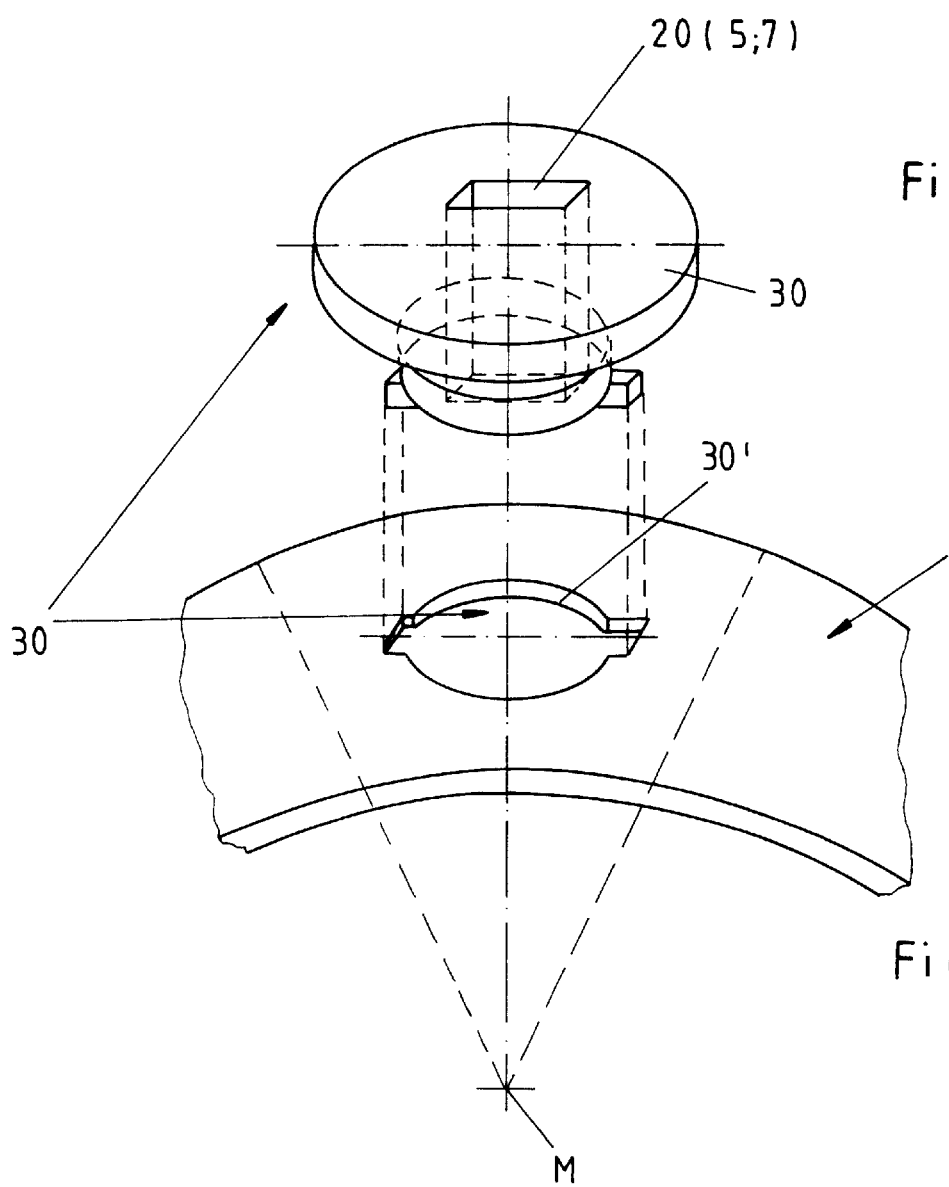

NONSKID DEVICE, NAMELY FOR PNEUMATIC-TIRED WHEELS OF VEHICLES ON ICE AND SNOW SURFACES

BACKGROUND OF THE INVENTION

The invention relates to a nonskid device, namely for pneumatic-tired wheels of vehicles on ice and snow surfaces.

Such a nonskid device for increasing the grip of wheels of vehicles is known from U.S. Pat. No. 2,443,261. This nonskid device can be mounted on the wheel rims of vehicles and consists of a base disk and a ring disk rotating around its center on which swivelling levers for swinging in and out triangular nonskid arms are articulated which are rotatably fixed to the base disk so that, at each rotation of the ring disk, the nonskid arms can swing out from a position retreated from the tire periphery to a radial operating position so that the pointed end sections project from the surface plane constituted by the tire tread and can engage into the ground. For this known nonskid device, the nonskid arms are beside the tire lateral surface even in the swung out position and cover in no way the tire tread so that the increasing of the grip of the vehicle wheels is not carried out by the direct effect of the tire or of its tread onto the antiskid arms and of the antiskid arms onto the ground surface. In operation the antiskid arms do not constitute an integrated component of the tire to obtain an effect which corresponds to that of spikes sunk into the tread profile of a tire.

Another antiskid device for tires of vehicles, which is known from FR 1 368 348, is constituted by a number of arm-type holding devices which may be mounted by means of a base disk on the rim of each vehicle, whereby the arm-type holding devices lap over the wheel tread in the operating position as well as also when not in use.

Another nonskid device, described in U.S. Pat. No. 2,610,898, is constituted by a great number of spike-type ribs or teeth which may be extended laterally besides the tire into an operating position but which do not lap over the tire tread. The swinging in and out of the radially arranged nonskid arms takes place by using a distortable disk which may be mounted on the rim of a vehicle. The nonskid arms used for this nonskid device are not resilient but are rigid, since they must engage into the ice or snow covered surface of the ground at each rotation of the wheel.

Moreover, from AT 325 435 a removable nonskid device for vehicles, preferably for pneumatic-tired wheels of vehicles, is known with one or several nonskid straps resting on the tread of the wheel tire which can be radially pushed into fastening bushes fixed on the rim outer side and which can be fixed thereon by means of a locking device and which embrace the profile of the tire also on the side turned to the vehicle, device for which the locking device comprises at least one, preferably two ratchets acting contrary to each other, placed parallel to the wheel surface plane, which are linked on the nonskid strap, whereby catches engage at the outer free end of the ratchets, the nonskid straps being completely pushed into the fastening bushes, on their ends turned to the wheel hub, and are held by springs in the locked position so that a nonskid device should be created which takes part in the radial movement of the wheel circumference so that the shock attenuation of the vehicle wheel is not hindered. This nonskid device comprises two essential parts, namely fastening bushes fixed on the rim outer side and nonskid straps which can be radially pushed into those and which lap over the tread of the wheel tire, whereby the fastening bushes do not constitute a non detachable unit with the nonskid straps.

The DE 27 59 899 describes a tired vehicle wheel, namely a pneumatic-tired vehicle wheel with a nonskid device for which the device for receiving the nonskid device is a component of the wheel. This nonskid device shows a supporting case in the art of a hub cap and a disk, which is connected with the wheel, as a component made of a base disk and a ring disk distortable relative hereto with at least two nonskid arms placed in this supporting case which can be swung in and out, while the base disk of the supporting case is fixedly connected with the wheel and constitutes a component part of the wheel. Because the nonskid device is an integrated component of the wheel, an easy removal of the nonskid device is not possible when not in use.

The DE 83 27 385 describes a nonskid device, namely for pneumatic-tired vehicle wheels on ice and snow surfaces which comprises a supporting disk which can be mounted on the wheel disk or rim with a number of nonskid arms radially running at an equal distance the one from the other and which can swivel around axes running parallel to the wheel disk bearing axis or which are fixed, which are made of a bent profile lapping over the tire tread and supporting on the outer side in their free ends a gripping profile or spikes made of a plastic or of another appropriate material, whereby, for fixing the supporting disk, the nonskid device has a fixing disk connected with the wheel disk or the rim which is provided with holding devices for the supporting disk which can be locked, whereas the fixing disk is fixedly connected with the wheel disk or the rim and constitutes a component part of the wheel.

All known nonskid devices have radially running arms of predetermined length which are placed in a fixed position on a bearing ring or on a supporting disk and which cover or embrace the tread tire together with their free ends. Because of the predetermined arm length and because of a fixing point for the arms the position of which is not variable, these nonskid devices can be used only for one tire size.

An adaptation of the length of the arms to different tire sizes is not possible. Thus, a retailer has to have in stock a great number of arms of different length so as to be able to deliver to the client nonskid devices with an arm length adapted to the tire size of the client's vehicle.

SUMMARY OF THE INVENTION

The aim of the invention is to create a nonskid device of the afore mentioned type which can be easily mounted on different sizes of vehicle tires by the retailer as well as by the vehicle's owner, whereby the size adjustment of the nonskid devices can be carried out in adaptation to the respective tire sizes without many technical efforts and without using arm-type gripping element supports of different length but is carried out only by varying the distance of the fixing point of the gripping element support from the tire tread. Moreover, the nonskid device should be flat collapsible; for an easy mounting of the nonskid device on a vehicle wheel, the arm-type gripping element supports should be swivellable in the art of a pendulum in a certain swivelling range.

According hereto, the first inventive embodiment consists in the fact that for a reciprocal swivelling movement of the arm-type gripping element supports around a center lying outside the center of the supporting element for example in form of a bearing ring a number of pivot bearings corresponding to the number of the gripping element supports is placed or provided for on the supporting element, whereby at least one gripping element support is held with its end turned to the supporting element on each pivot bearing, the supporting element showing a configuration in form of a plate or of a ring or another geometrical configuration.

The second embodiment consists in the fact that the gripping element supports are placed with their gripping elements on the supporting element with one end outside the center of the supporting element on the supporting element around swivelling axes running transversely to the middle axis of the supporting element to swing out the gripping element supports from the swung-in non operating position to the swung-out operating position and to swing in from this position to the non operating position, the supporting element showing a configuration in form of a plate or of a ring or another geometrical configuration.

The third embodiment consists in the fact that, for the adaptation of the nonskid device to different tire sizes, the distance of the fixing point of each gripping element support with its gripping element on the surface of the supporting element or on the ring surface of the ring-shaped supporting element to the tread tire on the supporting element is variable, whereby the fixing point for each gripping element support is adjustable to the tire size after the adjustment has taken place, the supporting element showing a configuration in form of a plate or of a ring or another geometrical configuration.

The fourth embodiment consists in the fact that a number of pivot bearings corresponding to the number of gripping element supports with their gripping elements is provided for on the supporting element, whereby each pivot bearing shows one or several seats outside the center of the supporting element so that, depending on the position of the seat, the nonskid device can be adapted to different tire sizes and that the gripping element supports with their gripping elements are placed on the supporting element at one end outside the center of the supporting element on the supporting element around swivelling axles which are transversal to the middle axis of the supporting element to swing out the gripping element supports from the swung-in non operating position to the swung-out operating position and to swing in from this position to the non operating position, the supporting element showing a configuration in form of a plate or of a ring or another geometrical configuration.

Each pivot bearing situated outside the center of the supporting element constitutes a constructional unit with the gripping element support which is assigned to it and is configured as one part. The pivot bearing and the gripping element support constitute thus one unit.

However, it is also possible to removably connect each pivot bearing with the gripping element support corresponding to it so that it is possible at any time, if wear occurs, to replace the pivot bearing as well as the corresponding gripping element support.

Each pivot bearing shows at least one centered seat for holding the gripping element support. For varying the nonskid device diameter, each pivot bearing shows at least one eccentric seat for supporting the gripping element support. According to a further embodiment each pivot bearing has at least one centered seat and for varying the nonskid device diameter at least one eccentric seat for supporting the gripping element support. Furthermore, each pivot bearing can have several seats for one gripping element support. A configuration for which the pivot bearing is provided with a centered seat and with several eccentric seats for the gripping element support is also possible.

The rotating or swivelling range of each pivot bearing is limited laterally.

For an embodiment of the invention, each gripping element support of the nonskid device is removably connected with the supporting element over a plug connection, whereby the fixing area of each gripping element support on or in the ring surface of the supporting element radially to the tire tread is configured variable in its position for adapting the nonskid device to different tire sizes by means of a device which consists of a lock-type slide travelling in the ring surface of the supporting element with at least one slit-shaped opening for introducing the gripping element support with its end turned away from the tire tread and of at least two openings configured in the ring surface of the supporting element for introducing the gripping element support with its end turned away from the tire tread so that, for varying the position of the fixing areas of the gripping element supports, each gripping element support with its end in its fixing area takes a tire tread close or tire tread far position.

According to an embodiment of the invention, each gripping element support of the nonskid device is removably connected with the supporting element, each gripping element support being fixed in its fixing area by means of a plug connection to a retaining disk as a bearing for the gripping element support, placed on a or in the ring surface of the supporting element, rotating around a horizontal axle when the nonskid device is fixed to the wheel or to the rim, this retaining disk showing off-center at least one slit-shaped opening for introducing the gripping element support in its end turned away from the tire tread so that the fixing area of each gripping element support on the distortable retaining disk radially to the tire tread for adapting the nonskid device to different tire sizes by distorting each retaining disk the slit-shaped opening is configured variable in its position and takes a tire tread close or tire tread far position.

According to a further embodiment of the invention, each gripping element support of the nonskid device is removably connected with the supporting element, each gripping element support being fixed in its fixing area by means of a plug connection to a retaining disk placed on a or in the ring surface of the supporting element, rotating around a horizontal axle when the nonskid device is fixed to the wheel or to the rim, this retaining disk showing off-center at least a first slit-shaped opening and in the center a second slit-shaped opening, parallel to the opening placed off-center, for introducing the gripping element support with its end turned away from the tire tread so that the fixing area of each gripping element support in the first slit-shaped opening of the distortable retaining disk radially to the tire tread for adapting the nonskid device to different tire sizes by distorting each retaining disk in the supporting element the first slit-shaped opening is configured variable in its position and takes a tire tread close or a tire tread far position.

Moreover rotating bearings are placed on the supporting element which are constructed for the engagement of the respective first ends of the gripping element supports so that the respective gripping element support is rotating in a surface plane parallel to the supporting element around the bearing or is swivelling around the bearing by a predetermined angle.

Such a nonskid device configured according to the invention brings the following advantages:

Instead of the known screwed connections for fixing the gripping element supports to a supporting element, for example in form of a ring body of nonskid devices, for the nonskid device according to the invention, the gripping element supports are held on the supporting element by means of a plug and/or of a swivelling connection, whereby the gripping element supports are swung out for use from a position swung close to the supporting element to the use position and, when not in use, can be swung close to the supporting element and, in addition to this, in the state for use, can be swivelled in the art of a pendulum around their fixing point on the supporting element.

By inserting the gripping element supports of the nonskid device into slit-shaped openings provided for at different distances from the tire tread for introducing and holding the gripping element supports with their free ends or by varying the distance position of at least one slit-shaped opening from the tire tread by distorting the distortable retaining disk showing the plug connection for the arms, i.e. the slit-shaped openings, an adaptation to different tire sizes is possible, the length of the gripping element supports remaining constant.

The gripping element supports of the nonskid device are slewable about their fixing point on the supporting element mutually to the periphery of the tire tread and/or collapsible onto the inner side of the supporting element around a swivelling axle situated transversely to the middle axle of the supporting element.

Due to the eccentric off-center arrangement relative to the center point of the supporting element of at least one pivot bearing and/or one slit-shaped opening in the distortable retaining disk in the supporting element for each gripping element support of the nonskid device, it is possible by distorting the retaining disk to vary the position of the fixing point for the gripping element support so that the fixing point takes once a tire tread close or a tire tread far position so that for example two different tire sizes can be operated.

A single antiskid device can thus be used for different tire sizes.

The retailer does not have to have several sizes of nonskid devices on store any longer.

While three different sizes of supporting elements and three different lengths of gripping element supports with gripping elements, i.e. thus six parts, must be kept on store for the conventional nonskid devices, the number of parts which must be in stock is reduced for example to three supporting elements of different length and to a gripping element support of predetermined length so that six different tire sizes can also be operated with these four parts.

Since preferably the supporting element and the gripping element supports are made of plastics, there are no metall parts at all.

The size adjustment of the nonskid device for adapting to different tire sizes can easily be carried out by the retailer and by the fitter as well as also by the buyer.

The parts of the nonskid device such as the supporting element and the gripping element support can be bought separately and can easily be put together without help in the art of a construction kit, whereby the client can simultaneously carry out a size adaptation to the existing tires.

Since each gripping element support of the nonskid device is held by means of a plug connection in the respective slits in the ring surface of the supporting element or in the distortable retaining disk, an easy mounting of the gripping element supports on the supporting element and also an easy removal of the gripping element supports from the supporting element is possible when, in the latter case, damaged gripping element supports have to be replaced.

Since each gripping element support of the nonskid device is swivelling in its plug connection around a swivelling axis running transversely to the longitudinal axis of each gripping element support, in the non operating state of the nonskid device, all gripping element supports can be swung in in direction of the supporting element thereon so that little space is necessary for the transport of the nonskid device in a vehicle, for the storage of the nonskid device and for the keeping in stock of the nonskid device.

Due to the distortability of the retaining disks for fixing the gripping element supports, the gripping element supports can be swivelled laterally in the art of a pendulum, which makes the mounting of the nonskid device much easier.

Advantageous configurations of the invention are characterized in the subclaims.

So, the invention provides for a further improved embodiment according to which the free end of each gripping element support of the nonskid device, which is held in the slit-shaped opening in the slide, in the ring surface of the supporting element or in the distortable retaining disk, shows a Z-shaped profile configuration with a first end section which is bent at a right angle to the linear running section of the gripping element support and with a second end section which is bent at a right angle to the first end section and parallel to the linear section, whereby the gripping element support is introduced into the opening with its end between the supporting element and the tire side wall surface in such a way that the second end section of the gripping element support rests on the outside of the ring surface of the supporting element or on the outside of the distortable retaining disk, whereby the gripping element support rests with its linear running section on the wall surface of the supporting element or of the ring body which is turned to the wheel which is provided, on the wheel side, with a swelling-type bearing surface. Because of this configuration, each gripping element support of the nonskid device is swivellable in its support or in its fixing area about an axle running transversely to the longitudinal direction of the gripping element support.

Moreover, each distortable retaining disk with its gripping element support can, when the gripping element support swivels, automatically swivel from its radial tire contact position around the middle axle of the retaining disk which is perpendicular to the retaining disk back to the position in which the gripping element support takes its radial contact position on the tire, whereby the swivelling back of each swivelling retaining disk with its gripping element support about a middle axle of the retaining disk which is perpendicular to the supporting element into its radial tire contact position is effected by means of elastic forces from a position which is swivelled relative to the middle axle of the retaining disk.

For the swivelling back of each distortable retaining disk with its gripping element support about a middle axis of the retaining disk which is perpendicular to the supporting element into a radial tire contact position for the gripping element support from a position swivelled relative to the middle axis of the retaining disk, the opening which receives the retaining disk in the ring surface of the supporting element which is configured, for example, as a bearing ring shows an oval form or a form in the art of an ellipse, whereby the size of the oval or ellipse-type retaining disk is dimensioned, compared with the size of the oval opening or of the ellipse-type opening, such that the length of the main axis of the retaining disk is smaller than the length of the main axis of the opening in the ring surface of the ring body of the ring-shaped supporting element and the length of the secondary axis of the retaining disk is less or at least the length of the secondary axis of the opening in the ring surface of the ring body. Due to this configuration, the retaining disk can be distorted only in a certain predetermined area with, as a result, that, when after distortion the retaining disk takes its bearing on the inner wall surface of the opening, a further distortion of the retaining disk is no longer possible; on the contrary, because of the resilient material properties of the used plastic, the retaining disk practically springs back to its initial position in which each gripping element support takes a radial position to the tire wall surface.

To improve the unrolling ability and for increasing the power, the nonskid device is configured such that the bent end, bearing on the tire tread (gripping element) of each gripping element support is configured as a fork or is V-shaped and has two legs running parallel the one to the other with a U-shaped gap lying between the legs, whereby the longitudinal edges of the legs turned to each other run parallel to each other and the outer longitudinal lateral edges of the legs are inclined relative to the axletree. However, the nonskid device can also be configured such that the bent end of each gripping element support bearing on the tire tread is configured as a fork or is V-shaped, whereby both legs of the end of the gripping element support are widened so that they are flare-shaped by constituting an approximately V-shaped gap towards the inner side of the wheel so that the legs are inclined to the axletree, whereby the outer longitudinal lateral edges and the inner longitudinal edges turned to each other are approximately parallel to each other.

The following improvements are proposed for the embodiment of the nonskid device for which rotating bearings are placed on the supporting element which are configured, for the engagement of the respective first ends of the gripping element supports, such that the respective gripping element support is rotating in a surface plane parallel to the supporting element about the bearing or that it is swivelling about the bearing by a predetermined angle:

For an easy mounting and eventually for the replacement of the gripping element supports, the rotating bearing is configured with a removable connection for the gripping element supports.

In a particularly preferred embodiment, the rotating bearing has a plug connection and a retaining disk placed on a ring surface of the supporting element and rotating about an axis of rotation perpendicular to the ring surface of the ring body of the ring-shaped configured supporting element, whereby the plug connection is connected resistent to torsion with the supporting element.

For introducing and fixing the first end of the gripping element supports on the supporting element, the plug connection has a slit configured symetrically to the axis of rotation of the retaining disk.

The retaining disk is appropriately circular or elliptic, whereby the supporting element has a circular or an elliptic opening in which the retaining disk is rotatably held by being press-fitted. For this purpose, the retaining disk has, for example, a peripheral ring groove which engages into the opening.

A simple connection between the gripping element support and the supporting element which can be realized by plugging and which is safe for operation is achieved by the fact that the first end of the gripping element supports has a Z-shaped profile configuration with a linear section of the gripping element support which is adjacent to the second end of the gripping element support, with a first end section which is bent at a right angle to the linear running section of the gripping element support and with a second end section bent at a right angle to the first end section and running parallel to the linear running section.

For example, a device is provided on each rotating bearing for acting of power thereon so that, by an excursion of a respective gripping element support from a tire contact position around the rotating bearing, the device for acting power exerts a restoring force in direction of the tire contact position. Hereby the device for acting of power has at least one spring or an elastic material placed between the rotating bearing and the supporting element.

BRIEF DESCRIPTION OF THE DRAWINGS

Embodiments of the invention will be explained in detail below with reference to the drawings.

FIGS. 3A and 3B show enlarged schematic views of a bayonet-type configured rotating bearing.

FIGS. 9, 9A and 9B show in schematic views a retaining disk held distortable in the supporting element with a slit-shaped opening configured eccentric in the retaining disk for fixing the gripping element support with its end turned to the retaining disk by means of a plug connection in three different fixing positions for the gripping element support for three different tire sizes.

DESCRIPTION OF PREFERRED EMBODIMENTS

Figure 1:
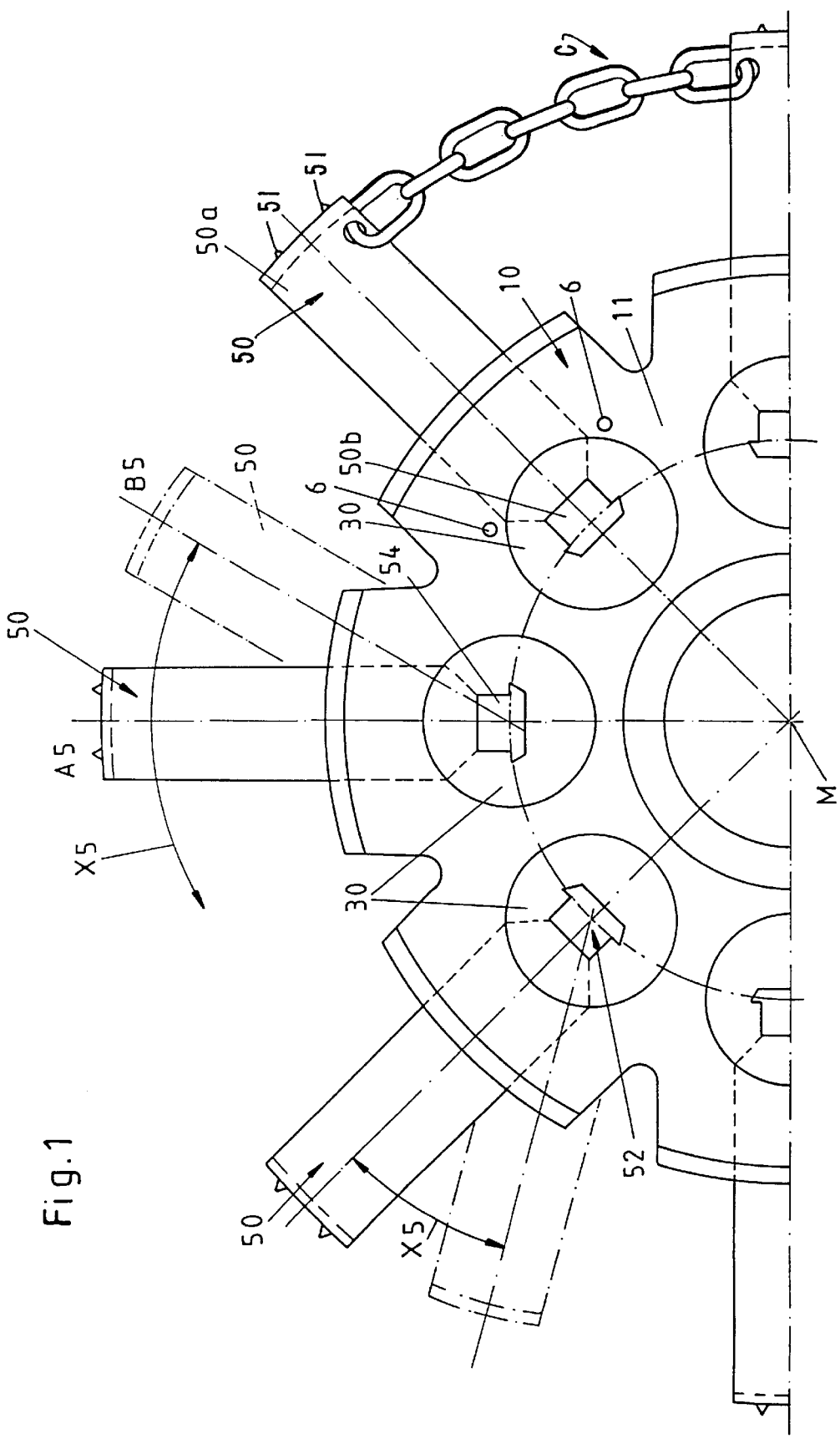
FIG. 1 shows in a topview a section of the nonskid device with gripping element supports placed on their supporting element configured as a ring body, swivelling about vertical axles to the supporting element, with gripping elements placed at their ends.
Figure 2:
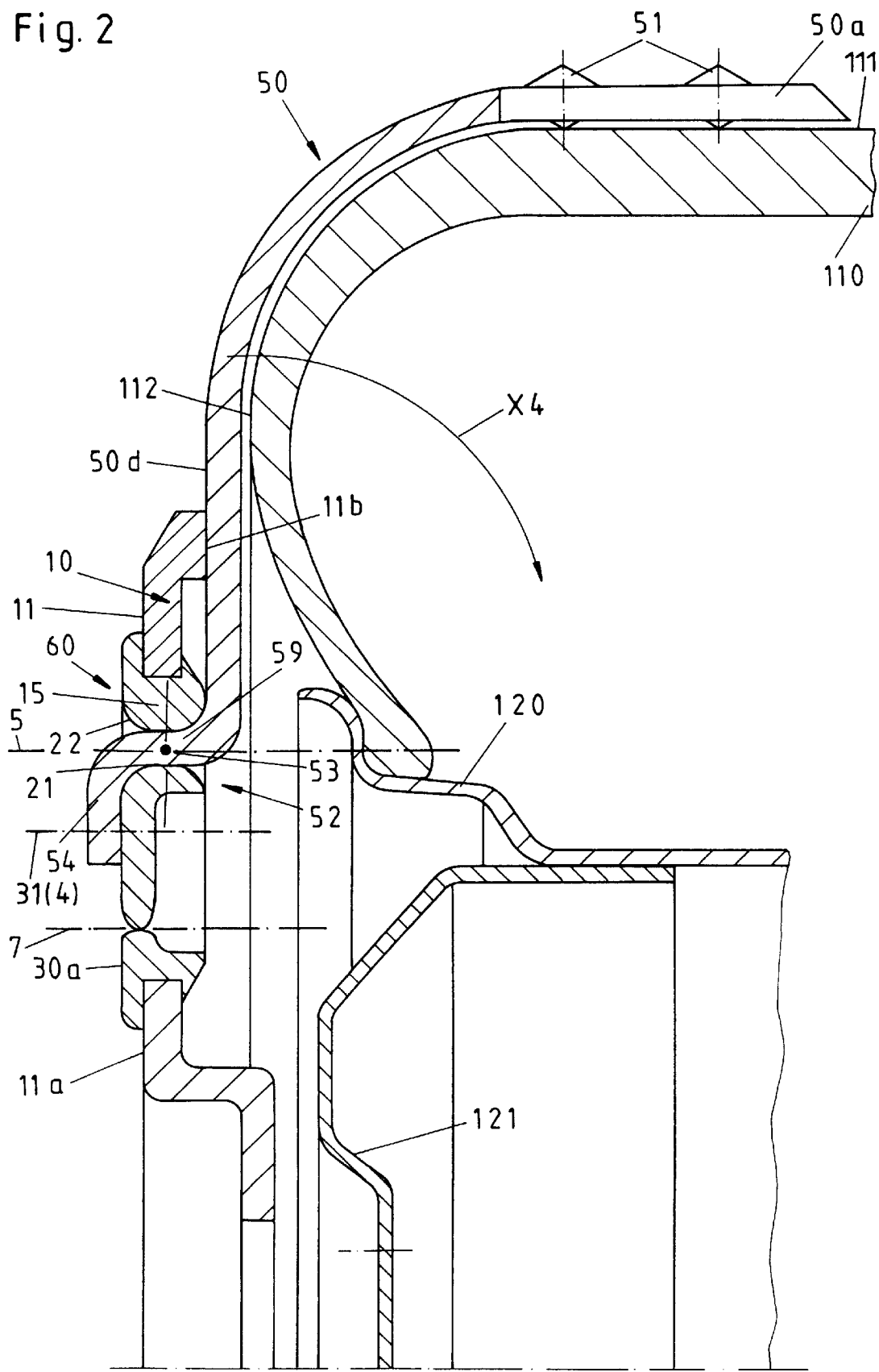
FIG. 2 shows a vertical section through a nonskid device fixed to a wheel rim with a gripping element support placed on its supporting element with a gripping element carrying spikes bearing on the tire tread.
Figure 3:
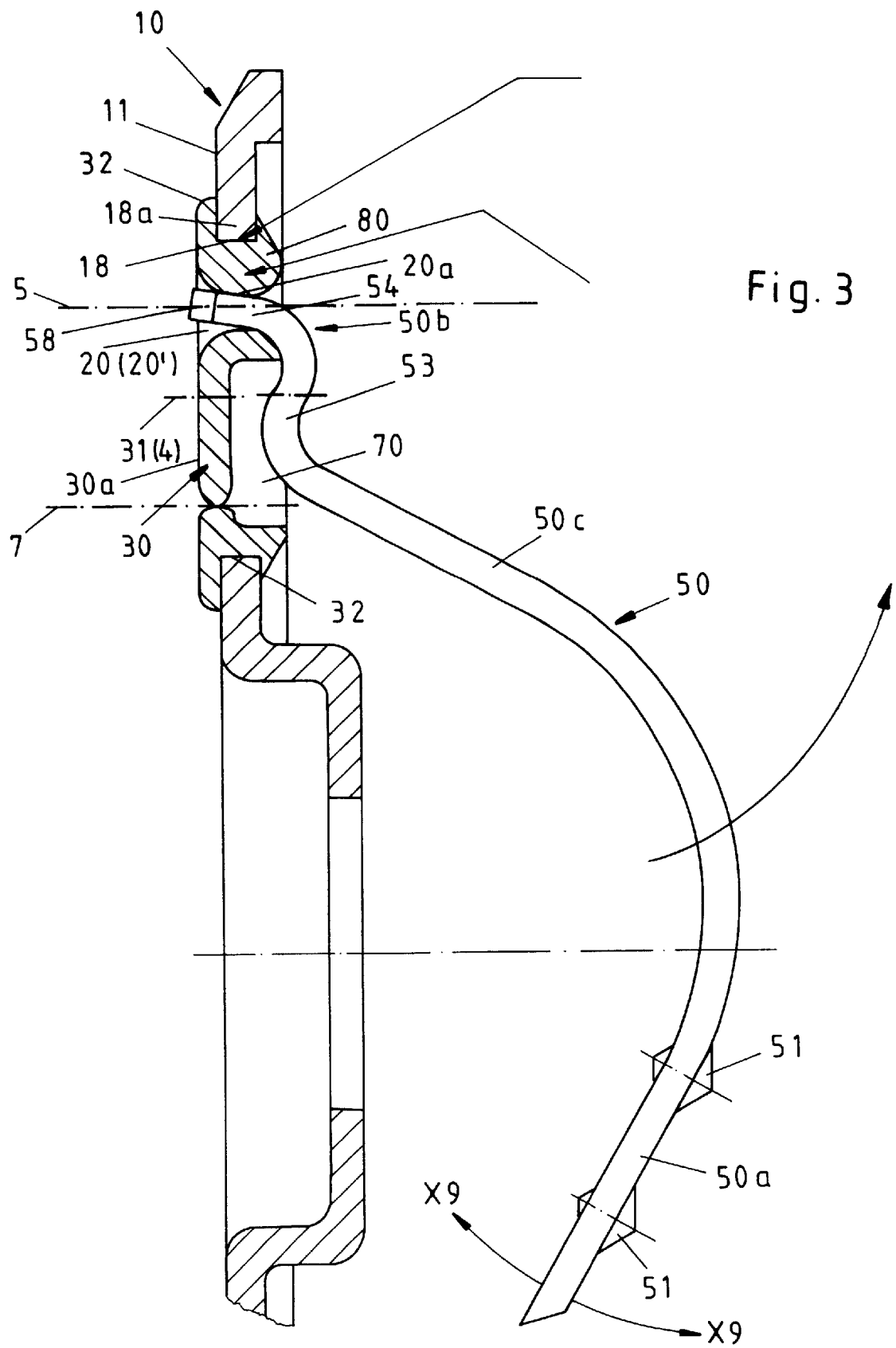
FIG. 3 shows a vertical section through the supporting element with a swung-in gripping element support.

The nonskid device 100 represented in FIGS. 1, 2 and 3, especially for pneumatic-tired wheels of vehicles on ice and snow surfaces, comprises a supporting element 10 as a supporting mounting for at least one arm-type gripping element support 50 or for a number of radially placed gripping element supports 50 which support at their both ends gripping elements 50a which can be fixed rigidly, removable or which can be hinged to the gripping element supports 50. The fixing of the supporting element 10 is carried out for example by rim screws or by other appropriate means, for example by elastic elements or the like on the rim 120 of a wheel of a vehicle, the wrench of which is designated by 121 and its tire by 110. The tire tread is represented by 111 and the tire lateral wall surface by 112 in FIG. 2. The supporting element 10 is preferably configured as a ring; however, it can also be plate-shaped or be circular or have any geometrical shape.

The gripping element supports 50 placed on the supporting element 10 which is configured for example as a ring body run radially and bear with a section 50c on the flank of the tire 110. The free ends 50a of the gripping element supports 50 are bent off and totally or partially lap over the tire tread 111 or bear thereon. The free ends of the gripping element supports 50 carry the gripping elements 50a with spikes 51 which are placed on the outside in the area of the tire tread 111 or in chain sections C or in continuous chain strings of chain nets which are in the tire circumferential direction on the tire tread 111. Any type of snow chains can be used here and can be placed on the gripping element supports or between their gripping elements.

Each gripping element support 50 is placed on the supporting element 10 or on its ring body outside the center of the supporting element thereon. The rotating bearing 30 which receives the respective gripping element support 50 is also placed off-center, i.e. eccentric to the center M of the supporting element 10 thereon or on the ring body. Furthermore, each gripping element support 50 is swivelling among others also by means of the rotating bearing 30 about a swivelling axis running parallel to the middle axis of the supporting element 10 and/or transversely to the middle axis of the supporting element 10 so that, in the first case, each gripping element support 50 is alternately swivelling in circulating direction of the tire tread and, in the second case, each gripping element support 50 can be swung from the operating position to the inner side of the supporting element 50 so that the nonskid device is collapsible in a minimal space.

For a reciprocal swivelling motion of the gripping element supports 50 about the center of the supporting element 10, a number of rotating bearings 30 corresponding to the number of gripping element supports 50 is placed or provided for on the supporting element, whereby at least one gripping element support 50 is held with its end turned to the supporting element on each rotating bearing 30. The gripping element supports 50 swivel together with the rotating bearings corresponding to them in direction of the arrow X5 (FIG. 1). If the supporting element 10 is ring-shaped, the gripping element supports 50 are held swivelling on the ring surface, the rotating bearings being then also placed in the ring surface.

For adapting the nonskid device 100 to different tire sizes, the distance of the fixing points 55 (FIGS. 7 to 9) of each gripping element support 50 on the ring surface 11 of the ring body of the ring-shaped supporting element 10 is configured variable, whereby the fixing point 55 for each gripping element support 50 can be locked to the tire size after adjustment.

Each rotating bearing 30 can constitute a constructional unit with the gripping element support 50 corresponding to the rotating bearing so that the rotating bearing 30 and the gripping element support is configured as one piece. However, it is also possible to removably connect each rotating bearing with the gripping element support 50 corresponding to it.

Each rotating bearing 30 shows at least a centered recess 20 or 4 (FIG. 3) for supporting the gripping element support 50. For varying the diameter of the nonskid device, each rotating bearing 30 is provided with at least one eccentric recess 20 or 5 for the support of the gripping element support 50.

But each rotating bearing 30 can have for example at least one eccentric recess 20 or 4 and for varying the diameter of the nonskid device at least one further eccentric recess 5 for supporting the gripping element support 50. For each gripping element support, each rotating bearing 30 can have several recesses 20 or 4 or 5 or 7. It is also possible to provide each rotating bearing 30 with an eccentric recess 20 or 4 and with several further eccentric recesses 20 or 5 or 7.

The arrangement of the eccentric recesses can also be such that each rotating bearing 30 has an eccentric recess 20 or 4 and respectively one further eccentric recess 20 or 5 or 7 for the gripping element support 50 above and below this eccentric recess.

Depending on the configuration of the rotating bearing, the rotating bearing can also be provided with a centered recess and at least one further eccentric recess, whereby the eccentric recesses are situated above or below the centered recess.

The rotating or swivelling range of each rotating bearing 30 is limited laterally in 6. This limitation can be carried out by cams or other mechanical devices fixed on the supporting element 10.

Each rotating bearing 30 is preferably rotatably held as a disk-shaped support for the gripping element support 50 in a recess in the supporting element 10. However, the rotating bearing 30 can also be held by being press fitted in the recess in the supporting element 10, however in such a way that the movability of the rotating bearing is not hindered.

The rotating bearing 30 is inserted for example as a bayonet into the recess corresponding to the rotating bearing or into the opening in the supporting element 10 (FIGS. 3A and 3B).

The rotating bearing 30 itself is made of plastic or of another appropriate material, whereby metallic materials can also be used for the manufacturing of the rotating bearing. The supporting element 10 can also be made of plastic or of another appropriate material, especially of a metallic material.

The gripping element supports 50 can be plugged into the support of the rotating bearings 30. The arrangement of the gripping element supports 50 on the rotating bearings or on the supporting element is such that the gripping element supports can be swung in and out as well in direction of the arrow X9, i.e. the gripping element supports 50 can be swung out to the position represented in FIG. 2 and can be swung in, when not in use, to the position represented in FIG. 3, so that, when it is not in use, the nonskid device shows minimal dimensions and can be stowed in a very compact way. Moreover, each gripping element support 50 is swivelling or distortable by means of the rotating bearing in direction of the arrow X5 (FIG. 1).

Each gripping element support 50 of the nonskid device 100 is removably connected with the supporting element 10 over a plug connection 60 which will be described more in detail below.

Figure 11:
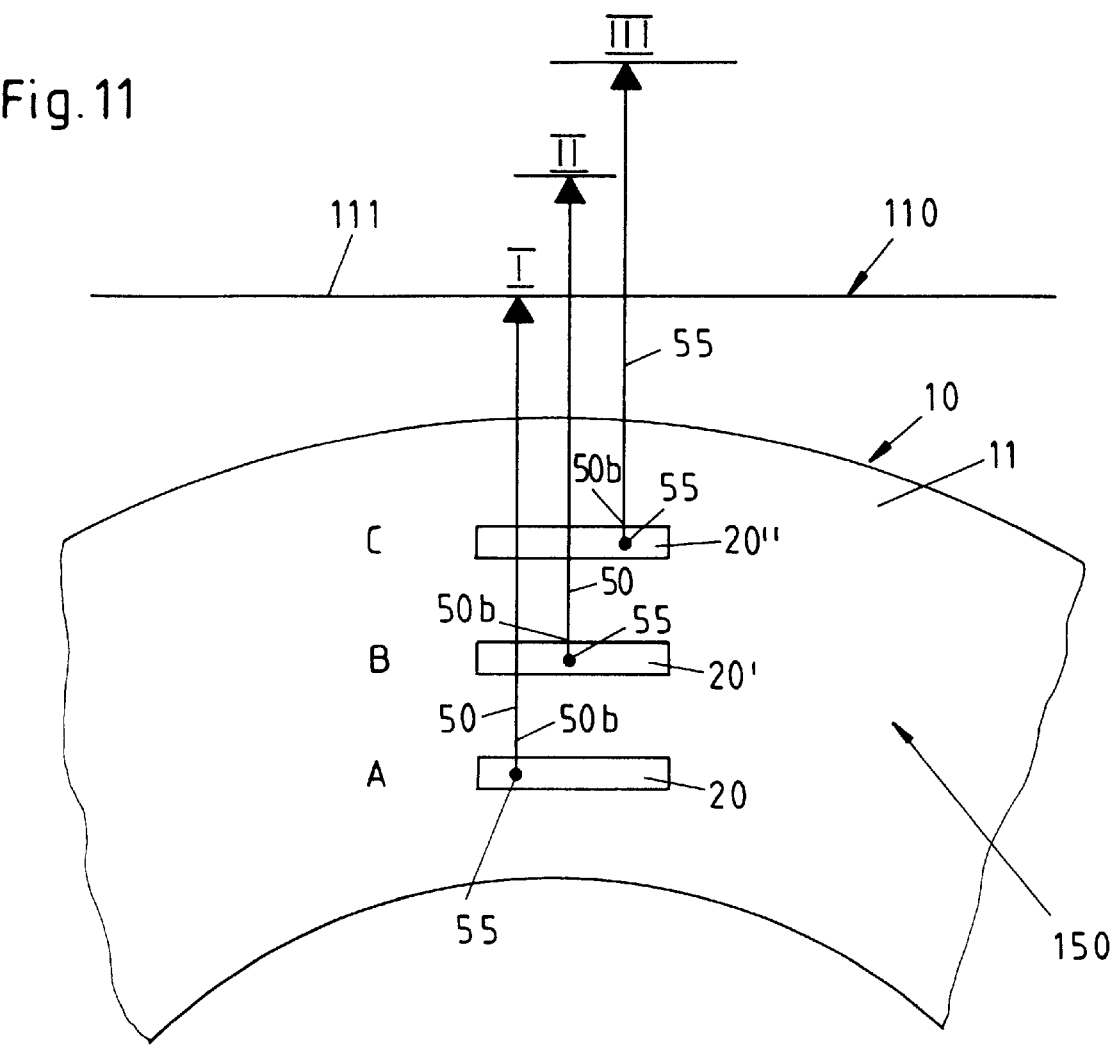
FIG. 11 shows in a schematic view a section of a supporting element with three slit-shaped openings superimposed in its ring surface for receiving a gripping element support of the nonskid device by means of a plug connection.

The fixing area 55 of each gripping element support 50 on or in the supporting element 10 or in or on the ring surface of the ring-shaped supporting element 10 is configured as being able to change its position radially to the tire tread 111 for adapting the nonskid device 100 to different tire sizes by means of a device 150. This device 150 for varying the position of the fixing area 55 for each gripping element support 50 of the nonskid device comprises, according to FIG. 11, at least two slit-shaped openings 20, 20' made in the ring surface 11 of the supporting element 10 or in the supporting element itself, arranged parallel to each other and to the tire tread 111 for introducing the gripping element support 50 with its end 50b turned away from the tire tread 111 so that, for varying the position of the fixing areas 55 of the gripping element supports 50 on the supporting element 10, each gripping element support 50 takes a tire tread close or a tire tread far position with its end 50b in its fixing area 55 by changing into the one slit-shaped opening 20 or into another slit-shaped opening 20'. For the embodiment shown in FIG. 11, three slit-shaped openings 20, 20', 20" are provided for so that gripping element supports 50, which are held in the slit-shaped openings 20, 20', 20" by means of a plug connection 60, can be used for different tire sizes for the same gripping element support length, the different tire sizes being indicated in I, II, III. Depending on the fact in which of the slit-shaped openings the gripping element support 50 of the nonskid device is inserted and fixed, the corresponding tire sizes are operated so that the nonskid device can be used for different tire sizes only by changing the position of the gripping element supports 50.

Figure 12:
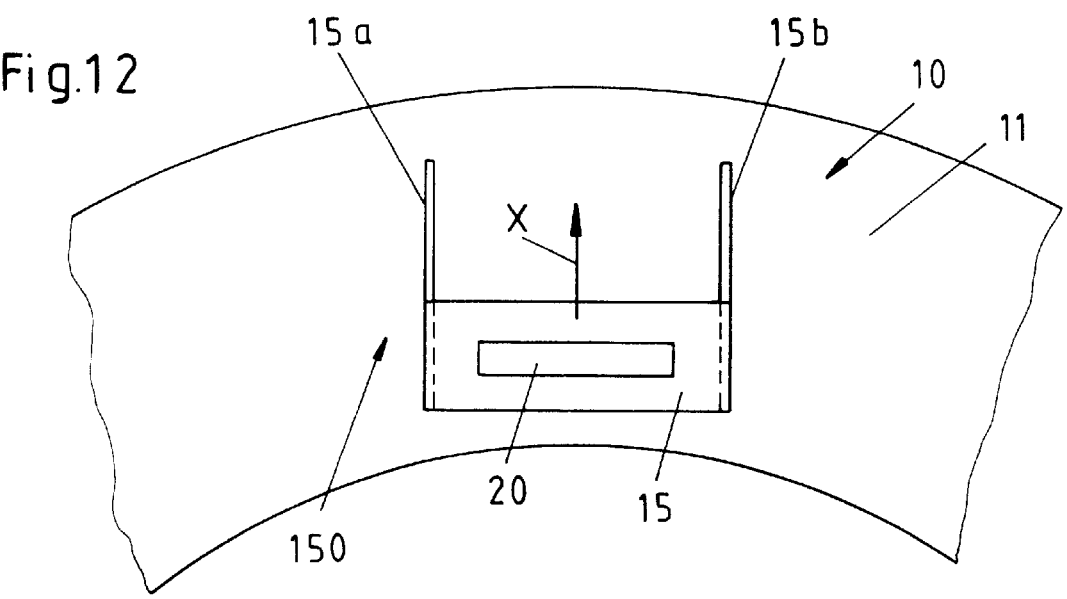
FIG. 12 shows in a schematic view a section of a supporting element with a retaining slide for the gripping element support which is positioned radially travelling in its radial ring surface and which can be locked in any travelling position.

For the embodiment according to FIG. 12, the device 150 for varying the position of the fixing areas 55 of the gripping element supports 50 on the supporting element 10 or on the ring body for a ring-shaped supporting element 10 consists of slides 15 which are travelling in the ring surface 11 of the supporting element 10 and which can be locked with at least one slit-shaped opening 20 for introducing the gripping element support 50 with its end 50b turned away from the tire tread 111. For the embodiment according to FIG. 12, the slide 15 travelling in the radial arrow direction X is provided with a slit-shaped opening 20 which is arranged running transversely to the travelling direction X. The slide 15 is guided by means of guides 15a, 15b which are placed or configured or moulded in the ring surface 11 of the supporting element 10. Due to the movability of the slit-shaped opening 20 by means of the slide 15, the fixing area 55 of each gripping element support 50 is changeable so that the nonskid device 100 can be used for different tire sizes also with this embodiment. The fixing area 55 takes a tire tread close or a tire tread far position, depending on the position of the slide 15. The slide 15 can be locked in any travelling position by means of a snap-in or a press-fit connection.

For the embodiment of a nonskid device 100 shown in FIGS. 1, 2 and 3, each gripping element support 50 of the nonskid device 100 is also removably connected with the supporting element 10. Each gripping element support 50 is then fixed in its fixing area 55 by means of a plug connection 60 on a retaining disk 30 placed on or in the ring surface 11 of the ring body of the supporting element 10, distortable about an axis 31 perpendicular to the ring surface 11 of the ring body, the nonskid device 100 being fixed on the wheel or on the wheel rim 120, the retaining disk serving as a bearing for the gripping element support 50. An opening 18 is made in the ring surface 11 of the ring body for each gripping element support 50 for receiving and supporting the retaining disk 30, opening in which the retaining disk 30 is held, guided and positioned. This retaining disk 30 shows off-center at least one slit-shaped opening 20 for introducing and fixing the gripping element support 50 with its end 50b turned away from the tire tread 111 by means of the plug connection 60 so that the fixing area 5 of each gripping element support 50 can change its position on the distortable retaining disk 30 in radial direction to the tire tread 111 for adapting the nonskid device 100 to different tire sizes by distorting the retaining disk 30 the slit-shaped opening 20 can vary its position and thus takes a tire tread close or a tire tread far position. The number of retaining disks 30 in the ring surface 11 of the bearing ring corresponds to the number of gripping element supports 50 which the nonskid device 100 has. Preferably, each distortable retaining disk 30 shows a slit-shaped opening 20 placed off-center.

Figure 5:
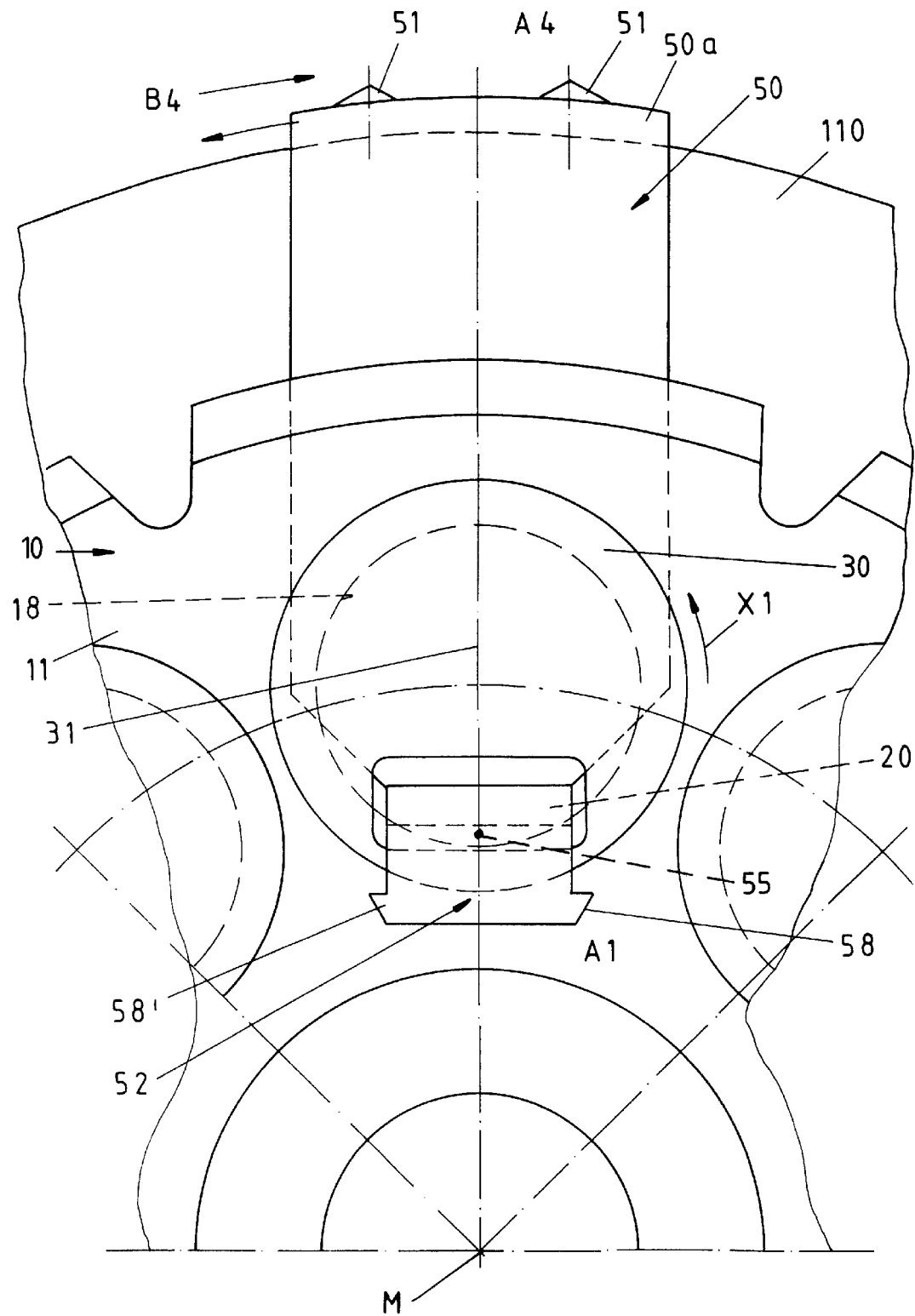
FIG. 5 shows a topview of a section of the supporting element with a gripping element support on a distortable retaining disk held in the supporting element with a slit opening in the retaining disk and eccentric to the retaining disk, the gripping element support being inserted in the opening in a position in which the fixing area of the gripping element support takes a tire tread far position on the distortable retaining disk.

FIG. 5 shows a position of the slit-shaped opening 20 in the retaining disk 30 in which the slit-shaped opening takes a tire tread far position, i.e. the slit-shaped opening 20 and thus the fixing area 55 for the gripping element support 50 are situated in a position turned away from the tire tread 111.

Figure 6:
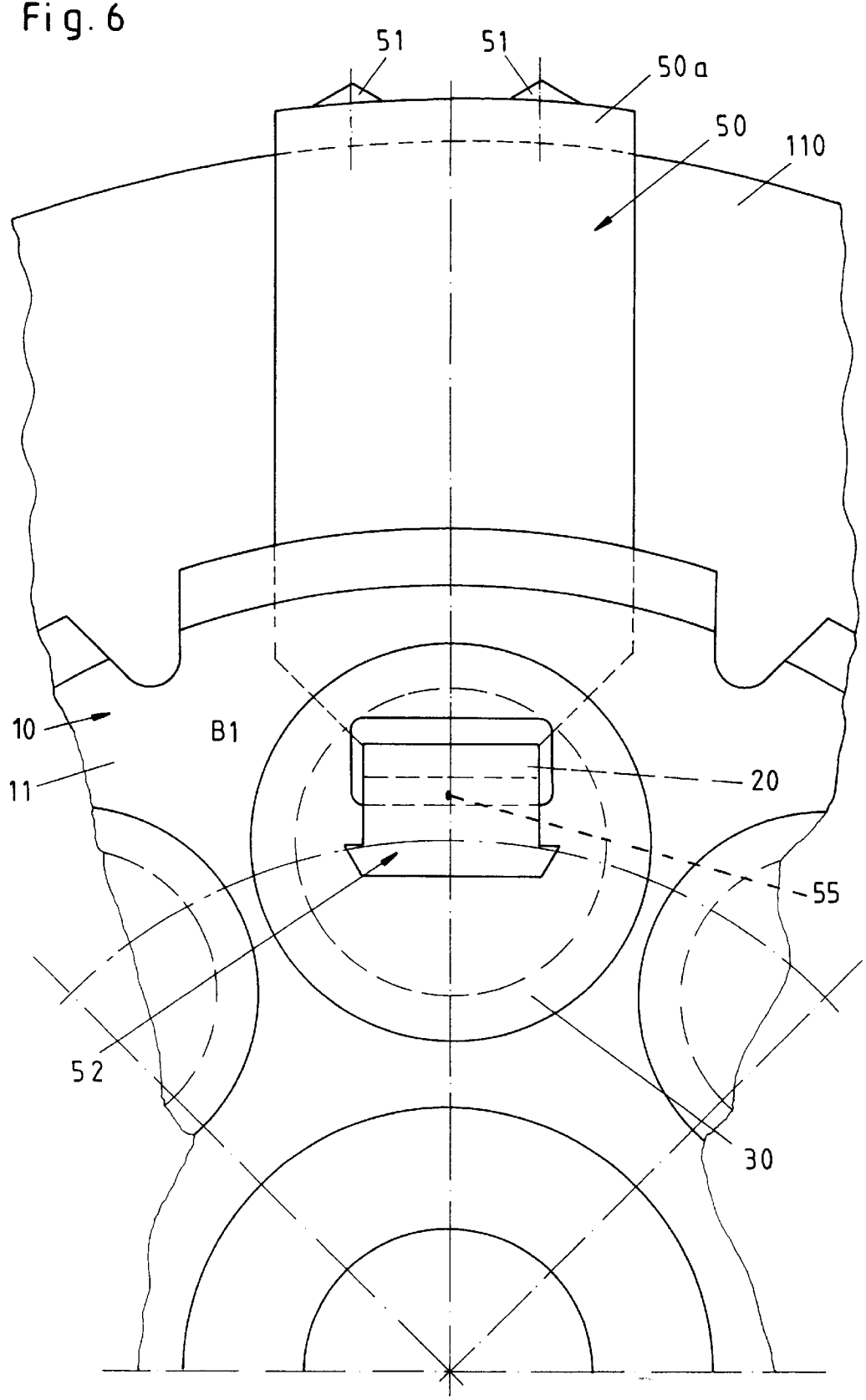
FIG. 6 shows a topview of a section of the supporting element with a gripping element support on a distortable retaining disk held in the supporting element with a slit opening in the retaining disk and eccentric to the retaining disk, the gripping element support being inserted in the opening in a position in which the fixing area of the gripping element support takes a tire tread close position on the distortable retaining disk.

In this position of the retaining disk 30 with its slit-shaped opening 20 the nonskid device can be used for small tire sizes, whereas for the position of the slit-shaped opening 20 in the retaining disk 30 according to FIG. 6, the fixing area 55 for the gripping element support 50 takes a tire tread close position after the retaining disk 30 has been transferred in the direction of the arrow X1 from the position A1 (FIG. 5) to the position B1 (FIG. 6). In the position of the slit-shaped opening 20 in the retaining disk 30 represented in FIG. 6, the gripping element support 50 takes a position by reason of which the nonskid device 100 can be used for a bigger tire size. According to this, the adaptation of the nonskid device to different tire sizes is achieved with the same length of the gripping element supports 50.

Figures 7, 8:
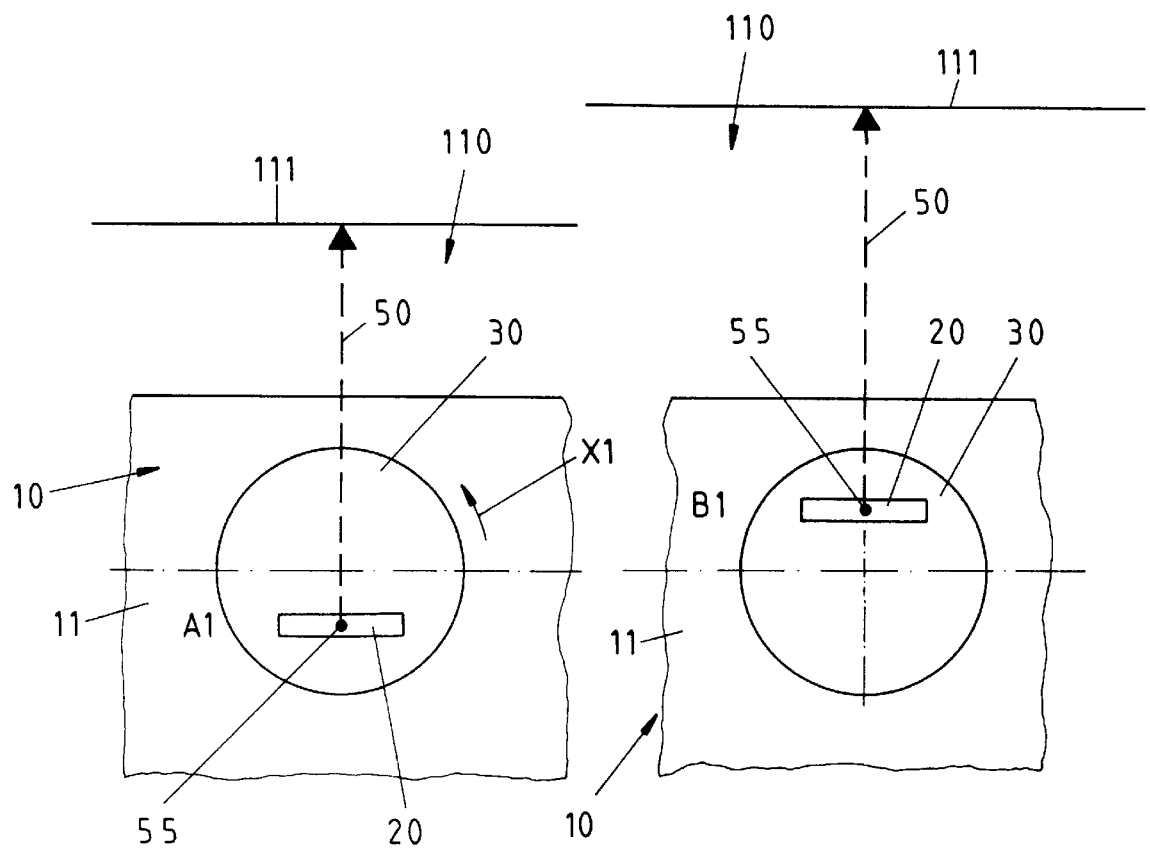
FIG. 7 shows in a schematic view a retaining disk held distortable in the supporting element with a slit-shaped opening configured eccentric in the retaining disk for fixing the gripping element support with its end turned away from the retaining disk by means of a plug connection, whereby the slit-shaped opening takes a position turned away from the tire tread for small tire sizes.
FIG. 8 shows in a schematic view a retaining disk held distortable in the supporting element with a slit-shaped opening configured eccentric in the retaining disk for fixing the gripping element support with its end turned to the retaining disk by means of a plug connection, whereby the slit-shaped opening takes a position turned away from the tire tread for big tire sizes.

FIGS. 7 and 8 show schematically the positions of the distortable retaining disk 30 according to FIGS. 5 and 6, whereby according to FIG. 7 the fixing point 55 of the gripping element support 50 takes a tire tread far position in the slit-shaped opening 20 so that in this position of the gripping element supports 50 the nonskid device can be used for small tire sizes. If the nonskid device 100 should be used for bigger tire sizes, the retaining disk 30 must be distorted in direction of the arrow X1 until the slit-shaped opening 20 takes the position B1 shown in FIG. 8. With the same length of the gripping element supports 50, it is thus possible to use the nonskid device 100 also for bigger tire sizes without having to use gripping element supports 50 with a different length.

Figure 9:
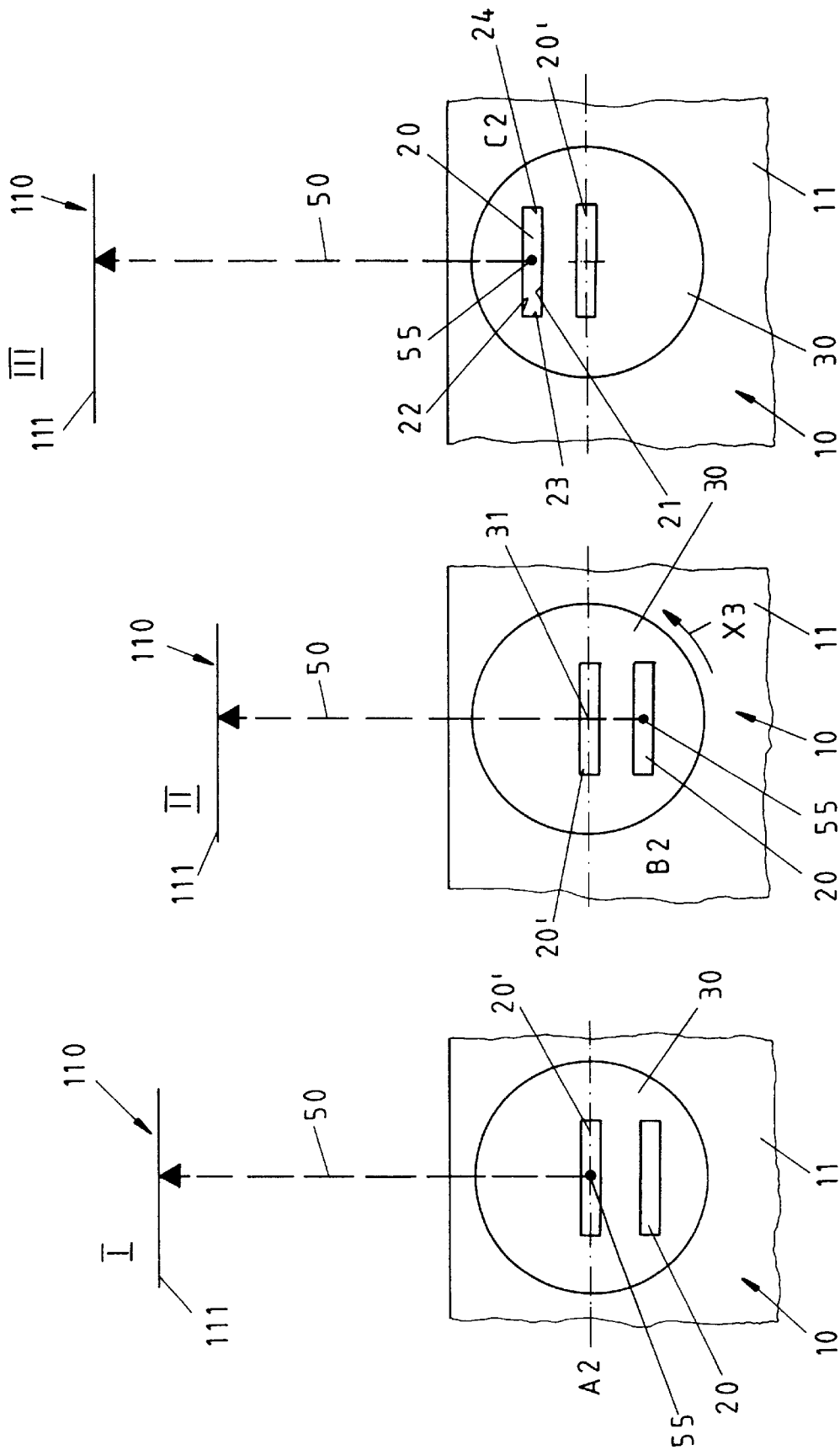

According to a further embodiment according to FIGS. 9, 9A, 9B, the distortable retaining disks 30 with their slit-shaped openings 20 for the arrangement of the gripping element supports 50 by means of plug connections 60 can be provided off-center with a first slit-shaped opening 20 and in the center with a second slit-shaped opening 20' running parallel to the off-center placed opening 20 for introducing the gripping element support 50 with its end 50b turned away from the tire tread 111. Owing to the fact that for this embodiment the distortable retaining disk 30 for each gripping element support 50 is provided with two differently positioned slit-shaped openings 20, 20', it is possible to operate three different tire sizes with a such designed nonskid device. If the gripping element support 50 is fixed in the slit-shaped opening 20' of the retaining disk 30, the fixing point 55 of the gripping element support 50 takes the position A2 shown in FIG. 9. If the gripping element support 50 is replugged and fixed in the slit-shaped opening 20, the fixing point 55 of the gripping element support 50 takes the position B2 shown in FIG. 9A. In this position of the retaining disk 30, the slit-shaped opening 20 takes a tire tread far position. If the retaining disk 30 swivels in direction of the arrow X3 about its center 31 so that its slit-shaped opening 20 takes a tire tread close position, as shown in FIG. 9B, the fixing poing 55 of the gripping element support in the slit-shaped opening 20 takes the position C2. In this way, it is possible to operate three different tire sizes I, II, III.

The free end 50b of each gripping element support 50 of the nonskid device held in the slit-shaped opening 20, 20' in the slide 15 or in the ring surface 11 of the supporting element 10 or in the distortable retaining disk 20 shows a Z-shaped profile configuration 52 which constitutes in connection with the slit-shaped opening 20, 20', 20" the plug connection 60 for fixing each gripping element support 50 on the supporting element 10. This Z-shaped profile configuration 52 of the end 50b of each gripping element support 50 comprises a first end section bent at a right angle to the linear running section 50c and a second end section 54 bent at a right angle to the first end section 53 and running parallel to the linear running section 50c of the gripping element support 50 (FIG. 2). The fixing of each gripping element support 50 is carried out in such a way that the gripping element support 50 is inserted with its free end 50b through the slit-shaped opening 20, 20' so that the bent end section 54 of the Z-shaped profile configuration 52 of the end 50b of the gripping element support bears on the outer wall surface 11a of the ring surface 11 of the ring body of the supporting element 10 or on the outer wall surface 30a of the distortable retaining disk 30, whereby the gripping element support 50 bears in the transition area of its linear running section 50c of the gripping element support with the bent end section 53 of the Z-shaped profile configuration 52 of the end 50b of the gripping element support 50 on the wall surface 11b of the supporting element 10 turned to the wheel preferably by means of a swelling-type bearing surface which is provided for on the wall 20a limiting the slit-shaped opening 20. This swelling-type bearing surface 80 simultaneously constitutes the longitudinal edge 22 limiting the slit-shaped opening 20, 20' (FIG. 2).

Due to the use of the plug connection 60 made of the Z-shaped profile configuration 52 of the end 50b of each gripping element support 50 and due to the slit-shaped opening 20, 20', each gripping element support 50 is not only removably connected with the supporting element 10 but furthermore is swivelling in the slit-shaped opening 20, 20' about an axis 59 which runs parallel to the supporting element 10 (FIG. 2). Thus, it is possible to swivel each gripping element support 50 of the nonskid device 100 in direction of the arrow X4, when the nonskid device is not in use and to swing it in on the inner side of the supporting element 10 (FIG. 3).

In order to be able to swing the gripping element supports 50 of the nonskid device as close as possible to the supporting element 10 without pulling the gripping element supports out of the slit-shaped openings 20, 20', the length of the end section 53 of the Z-shaped profile configuration 52 at the end 50b of each gripping element support is dimensioned such that, when folding the gripping element support to the inner side of the supporting element 10, the free end 10b of the gripping element support 50 slides on the outer wall surface 30a of the retaining disk 30 as far as the free end 50b of the gripping element support 50 comes to rest on the narrow sides 23, 24 of the slit-shaped opening 20, 20' which receives the gripping element support 50 by means of lateral snap-in cams 58, 58' moulded at the end of the gripping element support. Each slit-shaped opening 20, 20' is limited by longitudinal side walls 21, 22 and narrow side walls 23, 24 (FIG. 9B).

The nonskid device 100 being in operating condition, each gripping element support 50 takes up the position shown in FIG. 2. The free end 50b of the gripping element support with its Z-shaped profile configuration 52 is then inserted through the slit-shaped opening 20 so that the free end section 54 of the gripping element support 50 comes to rest on the outer wall surface 30a of the retaining disk and rests on this surface and lies with its whole section length on the retaining disk 30 (FIG. 2). By swinging in the gripping element supports 50, the free end 50b of each gripping element support 50 is led through the slit-shaped opening 20 as far as the lateral snap-in cams 58, 58' at the end 50b of the gripping element support 50 bear on the lateral edges 23, 24 of the slit-shaped opening 20.

To assist the swinging of each gripping element support 50 into the swung-in position (FIG. 3), each slit-shaped opening 20, 20' in the ring surface 11 of the supporting element 10 or in the slide 15 or in longitudinal side edges 21, 22 which limit the distortable retaining disk for the gripping element support 50 show an arc-shaped wall configuration as swinging aid for swinging each gripping element support 50 closer to the bearing ring or to the supporting element about a swivelling axis 59 which is perpendicular to the middle axis 31 of the retaining disk 30.

Figure 4:
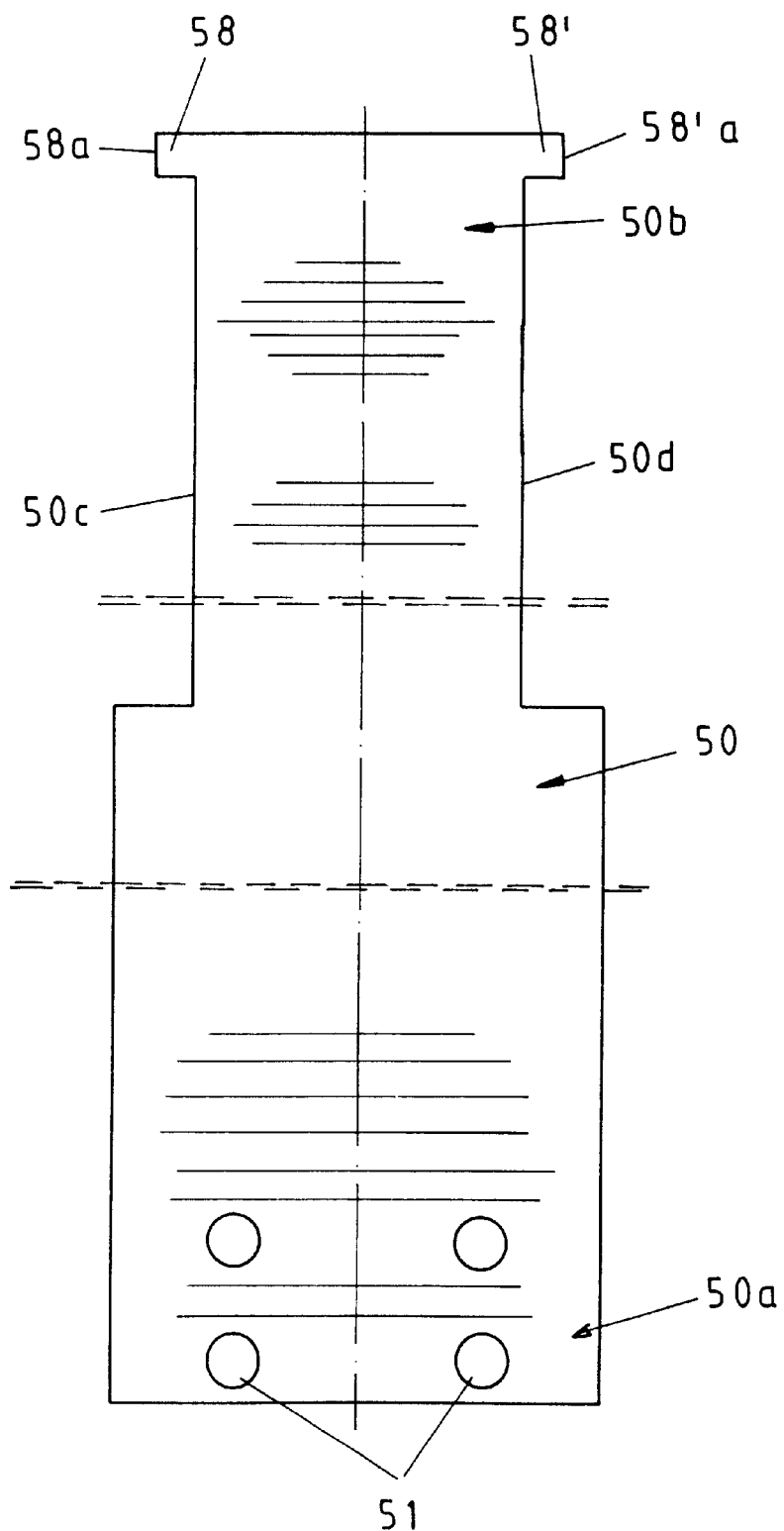
FIG. 4 shows a topview of the fixing end of the gripping element support turned away from the gripping element carrying the spikes with snap-in cams projecting on both sides.

The snap-in cams 58, 58' placed or moulded at the free end 50b of each gripping element support 50 of the nonskid device 100 extend on both sides of the longitudinal side edges 50d, 50e of the gripping element support 50, the length from the outer edge 58a of one snap-in cam 58 to the outer edge 58'a of the other snap-in cam 58 being dimensioned somewhat bigger than the length of the slit-shaped opening 20, 20' in the slide 15, the ring surface 11 of the ring body of the supporting element 10 or the distortable retaining disk 30 (FIG. 4).

The retaining disk 20 on the wall surface turned to the wheel or to the rim is provided with a recess 70 for receiving the bent sections 53, 54 of the end 50b of each gripping element support 50, the gripping elements 50 of the nonskid device being in swung-in position.

Figure 15:
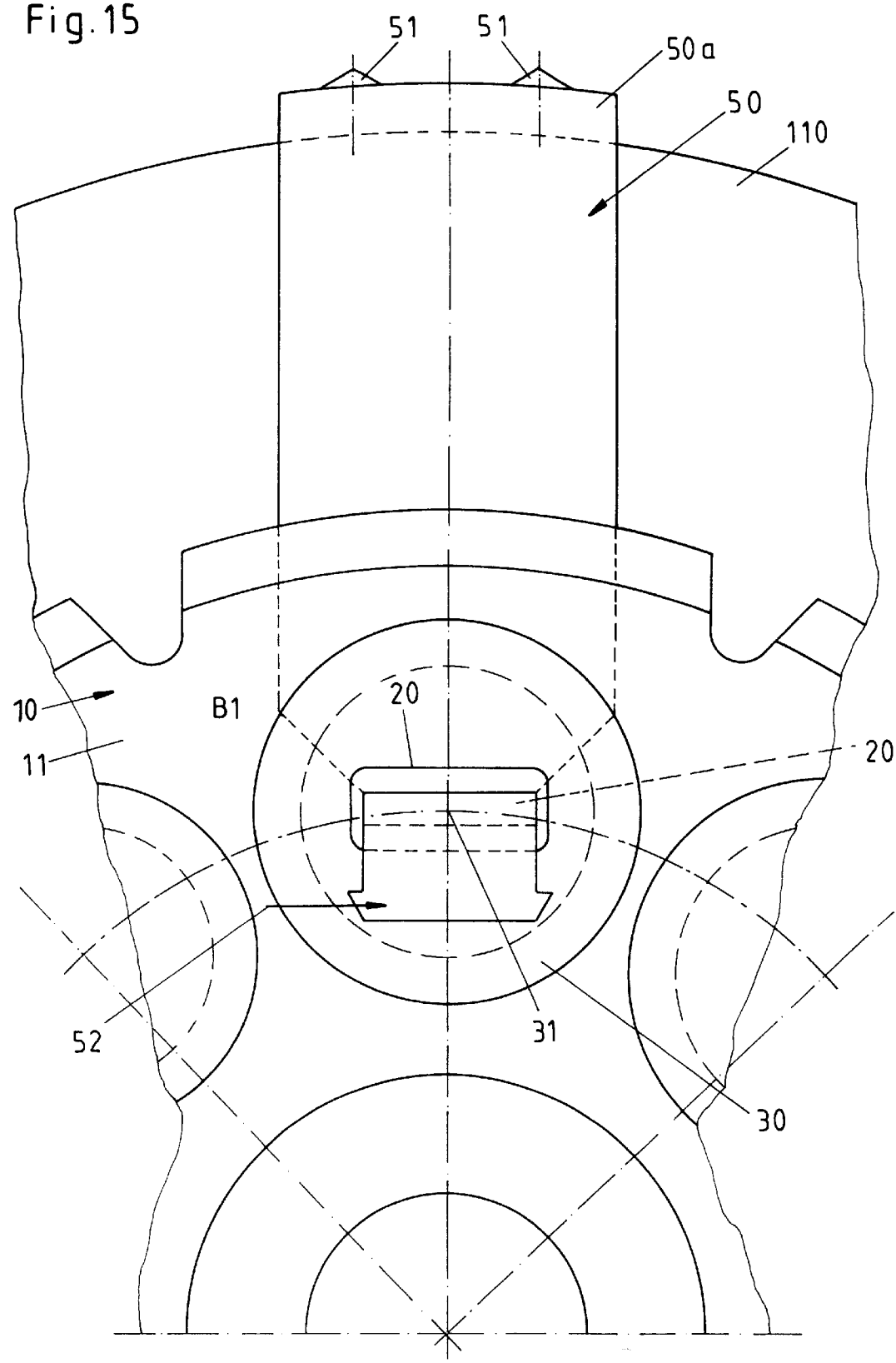
FIG. 15 is a schematic view of a retaining disk held distortable in a supporting element with a slit-shaped opening in the middle of the retaining disk for fixing a gripping element with its end turned to the retaining disk by means of a plug connection with an excursion possibility in the art of a pendulum.

Each distortable retaining disk 30 with the slit-shaped opening 20 or with the slit-shaped openings 20, 20' for supporting and receiving the gripping element support 50 with its end 50b is preferably configured circular and is rotatably held by being press fitted and fixed in its position in an opening 18, which is preferably also circular, made in the ring surface 11 of the ring body of the supporting element 10 (FIG. 5 or 15). The peripheral wall surface 32 of each distortable retaining disk 30 for the gripping element support 50 is configured as a circular groove 32 into which the peripheral wall 18a of the circular opening 18 which receives the retaining disk 30 moves into engagement (FIG. 3).

Figure 10:
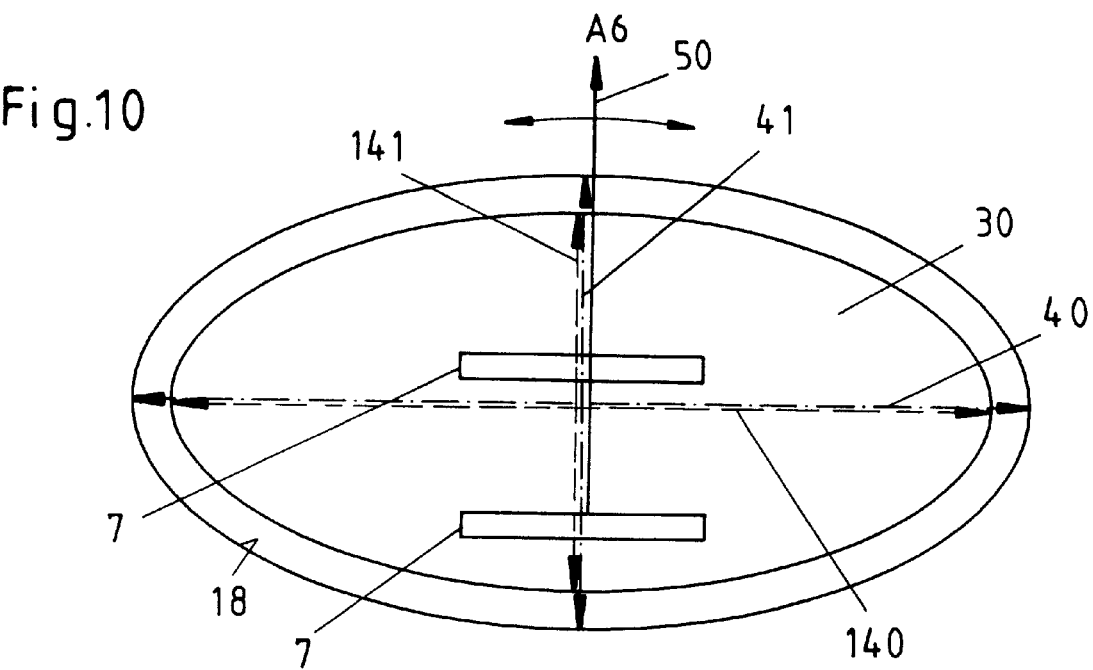
FIGS. 10 and 10A show in schematic views an elliptic retaining disk placed in an elliptic configured opening in the supporting element for receiving the distortable retaining disk in an initial position and in a swivelled position for the gripping element support.
Figure 10A:
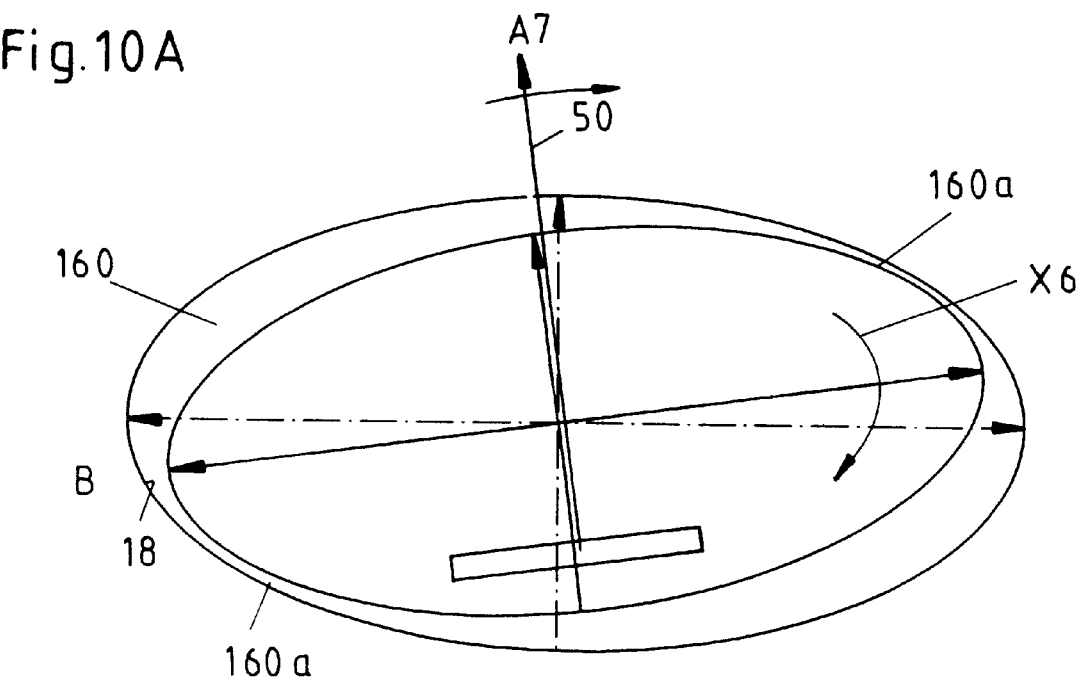
Figure 16:
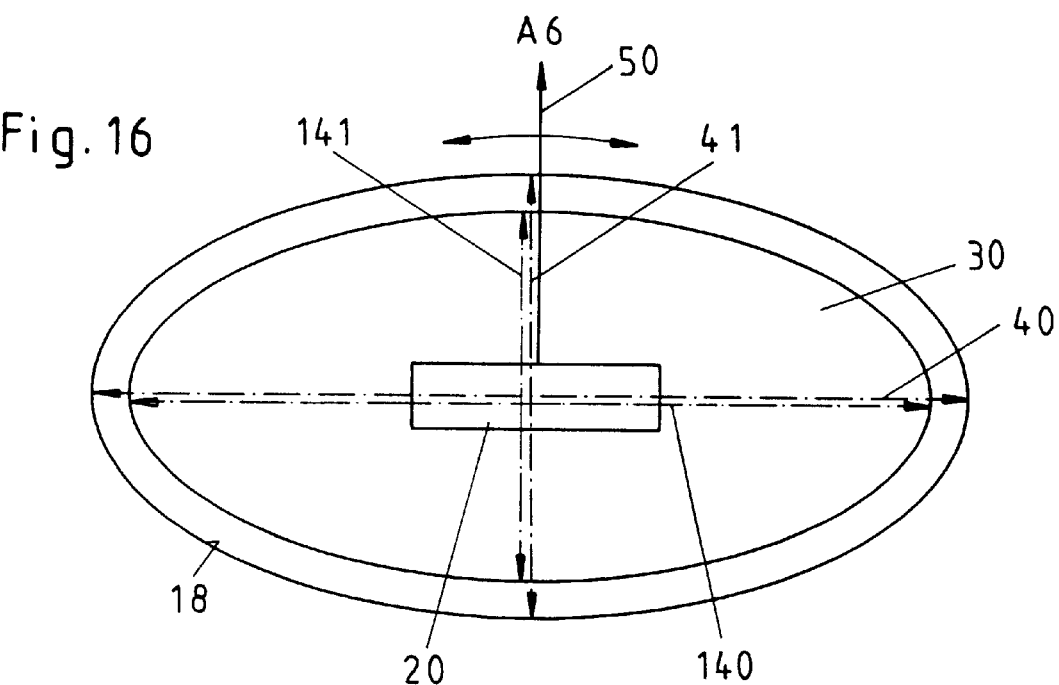
FIGS. 16 and 16A are schematic views of an elliptic retaining disk placed in an elliptic opening in the supporting element for receiving the distortable retaining disk in an initial position and in a swivelling position for a gripping element support of an embodiment which is alternative to that of FIGS. 10 and 10A.
Figure 16A:
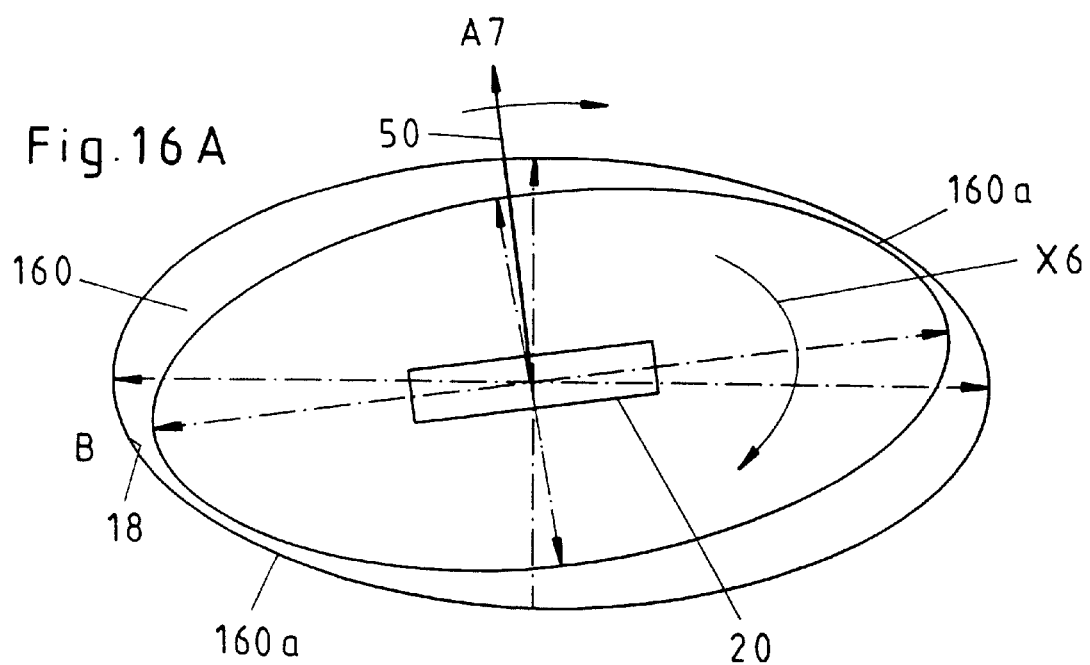

Each distortable retaining disk 30 with the gripping element support 50 which is held by means of the plug connection 60 in its slit-shaped opening 20, 20' can, when the gripping element support 50 swivels from its radial tire contact position A4 about the middle axis 31 of the retaining disk 30 which is perpendicular to the retaining disk 30 to a lateral position B4, swivel back to the position A4 in which the gripping element support 50 takes up its radial contact position on the tire (FIG. 5 or 15). All gripping element supports 50 of the nonskid device 100 are swivelling about their fixing points 50b into the distortable retaining disks 30 in direction of the arrow X5 (FIG. 1). The swivelling back of each gripping element 50 from the position B5 to the position A5 is assisted for example by resilient forces which act onto the retaining disk 30 and which assist the distorting back of the retaining disk 30 from a distorted position to its initial position. Another possibility for the swivelling back of each distortable retaining disk 30 with its gripping element support 50 about a middle axis 31 of the retaining disk 30 which is perpendicular to the ring body of the supporting element 10 to a radial tire contact position A5 for the gripping element support 50 from a position B5 swivelled to the middle axis 31 of the retaining disk 30 is, for example according to FIGS. 10 and 10A or to FIGS. 16 and 16A, the opening 18 receiving the retaining disk 30 which is designed oval or elliptic in the ring surface 11 of the ring body of the supporting element 10. The retaining disk 30 for the gripping element support 50 which is held in the opening 18 also shows an oval or elliptic shape, the size of the oval or elliptic retaining disk 30 relative to the oval or elliptic opening 18 being dimensioned such that the length of the main axis 140 of the retaining disk 30 is smaller than the length of the main axis 40 of the opening 18 in the ring surface 11 of the ring body of the supporting element 10. The length of the secondary axis 141 of the retaining disk 30 is less or corresponds at least to the length of the secondary axis 41 of the opening 18 in the ring surface 11 of the supporting element (FIGS. 10, 16). Due to this configuration of the retaining disk 30 relative to the opening 18 which receives the retaining disk there is a space between the peripheral border of the retaining disk 30 and the peripheral border of the opening 18 which can be filled with a resilient material, especially with plastic. If the gripping element support 50 is swivelled to the position shown in FIGS. 10A, 16A, the ratio of the conformation of the distortable retaining disk 30 to that of the opening 18 limits the swivelling motion as namely the elliptic retaining disk is limited in its distortional motion by bearing on the inner wall surface of the opening 18 (FIGS. 10A, 16A). With the aid of the resilient material placed in the space 160 between the retaining disk 30 and the peripheral wall of the opening 18, a restoring or swivelling back of the retaining disk 30 with its gripping element support 50 from the position A7 to the position A6 takes place (FIGS. 10, 16). Because the resilient material is pressed together into the space 160 in the areas 160a and, due to its restoring ability, tends to spring back to its initial position, the retaining disk 30 is moved back in direction of the arrow X6 to its initial position in which the gripping element support 50 takes up a radial position to the tire tread. The parts like the supporting element 10, the gripping element support 50, the slide 15 and the distortable retaining disk 30 of the nonskid device 100 are preferably made of plastic. The nonskid device 200 shows at least one, preferably three gripping element supports 50. For passenger cars, a maximal number of 12 supports is provided for, whereas the number of the gripping element supports 50 of the nonskid device for motor trucks can be more than 12.

Figure 13:
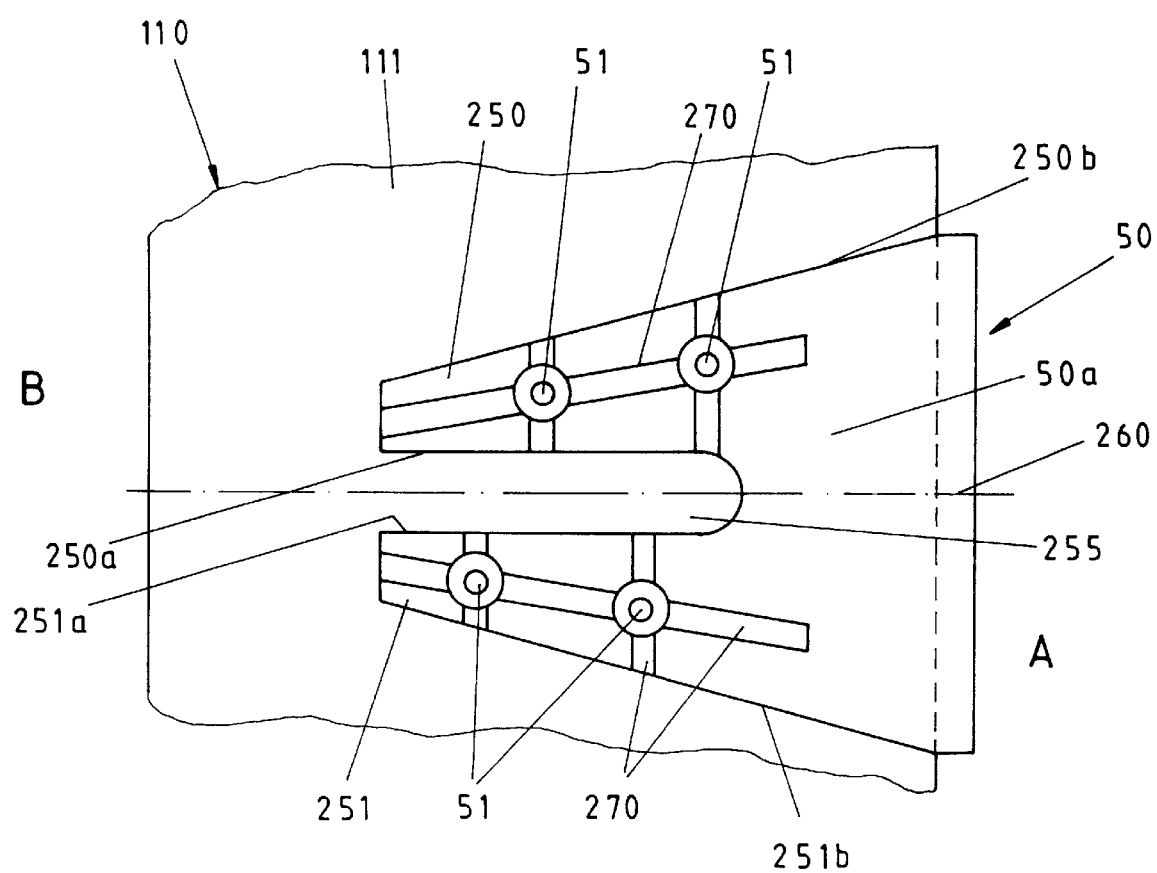
FIG. 13 is a topview of a section of the tire tread with a fork-type configured gripping element, close bearing on the tire tread, with longitudinal lateral edges inclined to the axletree and with contour accentuated profiles on the surface of the gripping element.

According to FIG. 13, the gripping element 50a is configured as a fork, i.e. is V-shaped at the end of the gripping element support 50 which bears on the tread 111 of the tire 110 and shows two legs 250 and 251, the longitudinal edges 250a, 251a of which, turned to each other, are parallel to each other and constitute hereby an approximately U-shaped space 255, while the outer longitudinal lateral edges 250b, 251b are inclined to the axletree 260. For the embodiment according to FIG. 13, the outer longitudinal lateral edges 250b, 251b are enlarged outwards in direction A, whereby the longitudinal lateral edges 250b, 251b can be enlarged inwards also in direction A.

Figure 14:
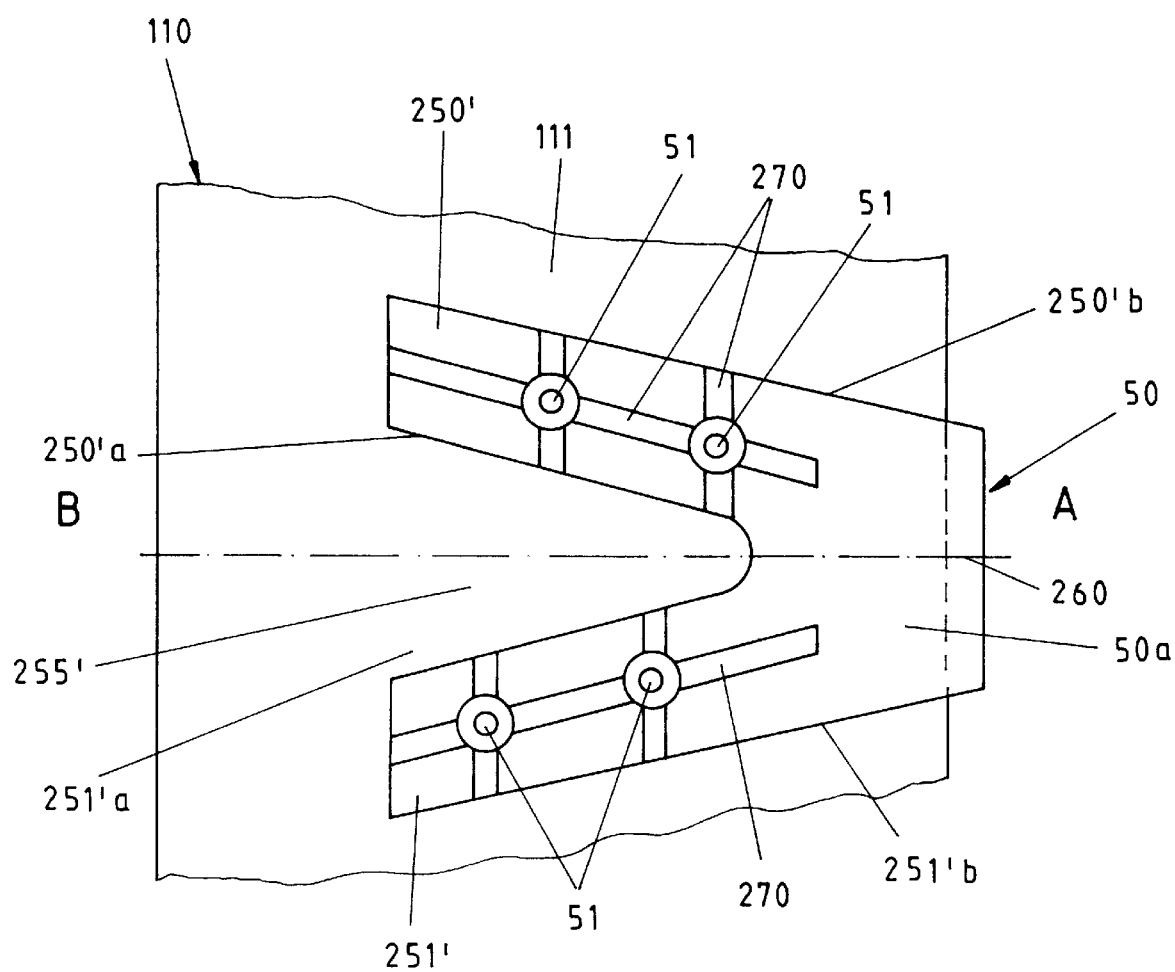
FIG. 14 is a topview of a section of the tire tread with a further embodiment of a gripping element close bearing thereon.

For the embodiment according to FIG. 14, the gripping element 50a bearing on the tire tread 111 is also configured as a fork, i.e. is V-shaped at the end of the gripping element support 50. Both legs 250', 251' of the gripping element 50a are extended such that they widen in direction B to the inner side of the wheel so that an approximately V-shaped space 255' is obtained, whereby the outer longitudinal lateral edges 250'b, 251'b and the inner longitudinal edges 250'a, 251'a turned to each other are approximately parallel to each other. For this embodiment also, the outer longitudinal lateral edges 250'b, 251'b are not parallel to the axletree 260. With this configuration of the gripping element 50a according to FIGS. 13 and 14 a power increase and a smoother unrolling are obtained.

As may be seen in FIGS. 13 and 14, the surfaces of the legs 250, 251 and 250', 251' of the gripping element 50a bearing on the tire tread 111 are provided with contour accentuated profiles 270 in form of crossing profiled webs, spikes 51 being moulded in the respective crossing points of the profiled webs.

FIG. 15 shows a representation of an alternative embodiment similar so that of FIG. 5 for which the retaining disk 30 shows only one slit 20 symmetrically to the axis of rotation 31. In other words, the slit 20 is made in the center of the retaining disk 30. This guarantees the swivellability of the gripping element support 50 as indicated by A5 and B5 in FIG. 1. For adapting to different tire sizes, for this embodiment the gripping element support 50 is simply removed from the detachable support in the slit 20 and another gripping element support 50 of appropriate length is inserted. The retaining ring 30 constitutes a bearing pressed into the supporting element 10 or into the bearing ring which resists to all necessary revolutions, pressure loads and torsion loads. The plug connection between the gripping element support 50 and the bearing 20, 30 also resists to these loads. Thus, a particularly advantageous plug and rotating connection is available for the gripping element supports 50, whereby the simple insertion of the gripping element supports 50 and the replacement thereof can be carried out by the end-user himself. For example, the gripping element support 50 and the bearing 20, 30 are designed as a combined injection moulded part. We refer to the statements above with respect to FIG. 5 for the further explanation of FIG. 15.

FIGS. 16 and 16A show a representation similar to that of FIGS. 10 and 10A, an alternative embodiment with a slit 20 designed symmetrically about the center of the retaining disk 30 being again provided for as for the embodiments according to FIGS. 5 and 15. Apart from that, we refer to the embodiments above with respect to FIGS. 10 and 10A for the further explanation of FIGS. 16 and 16A.

What is claimed is:

1. A nonskid device for pneumatic-tired wheels which is held at one end on the wheel of the vehicle and which shows a number of arm-type gripping element supports (50) placed on a supporting element (10), partially overlapping the tire tread (111), with gripping elements (50a) provided for at their free ends, which show on outside spikes (51) or chain sections connecting respectively two gripping element supports with each other or chain strings of chain nets bearing on the tire tread (111) in the tire circumferential direction, wherein, for a swivel movement back and forth of the gripping element supports (50) with their gripping elements (50a) around a swivel center positioned away from the center of the supporting element (10), a number of pivot bearings (30) corresponding to the number of the gripping element supports (50) is placed or provided for on the supporting element (10), wherein each pivot bearing (30) is swivellable about an axis extending parallel to an axletree and wherein at least one gripping element support (50) is held with its end turned to the supporting element (10) on each pivot bearing (30), the supporting element (10) showing a configuration in form of a plate or of a ring or another geometrical configuration.

2. A nonskid device for pneumatic-tired wheels which is held at one end on the wheel of the vehicle and which shows a number of arm-type gripping element supports (50) placed on a supporting element (10), partially overlapping the tire tread (111), with gripping elements (50a) provided for at their free ends, which show on outside spikes (51) or chain sections connecting respectively two gripping element supports with each other or chain strings of chain nets bearing on the tire tread (111) in the tire circumferential direction, wherein the gripping element supports (50) with their gripping elements (50a) of the center of the supporting element (10) having a middle axis are placed on the supporting element around swivelling axles provided by pivot bearings (30) and extending transversal to the middle axis of the supporting element (10) to swing out the gripping element supports (50) from the swung-in non operating position to the swung-out operating position and to swing in from this position to the non operating position, wherein each pivot bearing (30) is swivellable about an axis extending parallel to an axletree and wherein the supporting element (10) has a configuration in form of a plate or of a ring or another geometrical configuration.

3. A nonskid device for pneumatic-tired wheels which is held at one end on the wheel of the vehicle and which shows a number of arm-type gripping element supports (50) placed on a supporting element (10), partially overlapping the tire tread (111), with gripping elements (50a) provided for at their free ends, which show on outside spikes (51) or chain sections connecting respectively two gripping element supports with each other or chain strings of chain nets bearing on the tire tread (111) in the tire circumferential direction, wherein, for the adaptation of the nonskid device to different tire sizes, the distance of the fixing point (55) of each gripping element support (50) with its gripping element (50a) on the surface (11) of the supporting element (10) or on the ring surface of the ring-shaped supporting element (10) to the tread tire (111) on the supporting element (10) is variable, whereby the fixing point (55) for each gripping element support (50) is adjustable to the tire size after the adjustment has taken place, the supporting element (10) showing a configuration in form of a plate or of a ring or another geometrical configuration.

4. A nonskid device for pneumatic-tired wheels which is held at one end on the wheel of the vehicle and which shows a number of arm-type gripping element supports (50) placed on a supporting element (10), partially overlapping the tire tread (111), with gripping elements (50a) provided for at their free ends, which show on outside spikes (51) or chain sections connecting respectively two gripping element supports with each other or chain strings of chain nets bearing on the tire tread (111) in the tire circumferential direction, wherein a number of pivot bearings (30) corresponding to the number of the gripping element supports (50) with their gripping elements (50a) is provided for on the supporting element (10), each pivot bearing (30) showing one or several recesses (20; 4) lying outside the center of the supporting element (10) so that, depending on the position of the recess (20; 4), the nonskid device can be adapted to different tire sizes and that the gripping element supports (50) with their gripping elements (50a) are placed on the supporting element (10) at one end outside the center of the supporting element (10) on the supporting element around swivelling axles which are transversal to the middle axis of the supporting element (10) to swing out the gripping element supports (50) from the swung-in non operating position to the swung-out operating position and to swing in from this position to the non operating position, the supporting element (10) showing a configuration in form of a plate or of a ring or another geometrical configuration.

5. A nonskid device according to claim 1, wherein each pivot bearing (30) constitutes a constructional unit with the gripping element support (50) which is assigned to it and is configured as one part or is removably connected with the gripping element support (50) which is assigned to it.

6. A nonskid device according to claim 1, wherein each pivot bearing (30) situated outside the center of the supporting element (10) shows one or several recesses (20; 4) for supporting the gripping element support (50) among which, for diameter variations of the nonskid device, each pivot bearing (30) shows at least one eccentric recess (20; 5) for supporting the gripping element support (50).

7. A nonskid device according to claim 1, wherein each pivot bearing (30) situated outside the center of the supporting element (10) shows respectively at least one eccentric or centered recess (20; 4) and for diameter variation of the nonskid device at least one further eccentric recess (5) for supporting the gripping element support (50).

8. A nonskid device according to claim 1, wherein each pivot bearing (30) situated outside the center of the supporting element (10) shows two or several recesses (20; 4; 5; 7) for one gripping element support (50).

9. A nonskid device according to claim 1, wherein each pivot bearing (30) situated outside the center of the supporting element (10) shows a first recess which is arranged eccentrically or centered within the pivot bearing and two or several second recesses (20; 5; 7) arranged eccentrically within the pivot bearing for the gripping element support (50).

10. A nonskid device according to claim 1, wherein each pivot bearing (30) situated outside the center of the supporting element (10) shows a first recess which is arranged eccentrically or centered within the pivot bearing and respectively one second recess (20; 5; 7), arranged eccentrically within the pivot bearing above and below the first recess (20; 4), for the gripping element support (50).

11. A nonskid device according to claim 1, wherein each pivot bearing (30) situated outside the center of the supporting element (10) is configured as an oval or as a circular retaining disk and that the rotating or swivelling range of each pivot bearing (30) is limited laterally (6).

12. A nonskid device according to claim 1, wherein each pivot bearing (30) situated outside the center of the supporting element (10)
a) is held rotatably as a disk-shaped support for the gripping element support (50) in a recess in the supporting element (10) or
b) is held by being press-fitted in the recess in the supporting element (10) or
c) is inserted as a bayonet into the recess (30') corresponding to the pivot bearing (30) or into the opening in the supporting element (10).

13. A nonskid device according to claim 1, wherein at least one of the pivot bearing (30), and/or the supporting element (10), the gripping element support (50), and the gripping element (50a) are made of plastic or of metallic materials.

14. A nonskid device according to claim 1, wherein the pivot bearings have supports and the gripping element supports (50) can be inserted into the supports of the pivot bearings (30) and can swivel in a surface plane constituted by the supporting element (10), wherein each gripping element support (50) can swivel about at least one axis extending parallel to and one axis extending transversely to the axletree.

15. A nonskid device according to claim 1, wherein the gripping element supports (50) are rotatable or swivellable in the supporting element circumferential direction by means of the pivot bearings (30).

16. A nonskid device according to claim 1, wherein each gripping element support (50) of the nonskid device (100) is removably connected with the supporting element (10) over a plug connection (60), whereby the fixing area (55) of each gripping element support (50) on the supporting element (10) or on the ring surface (11) of the ring-shaped supporting element (111) radially to the tire tread (111) is configured variable in its position for adapting the nonskid device (100) to different tire sizes by means of a device (150) which consists of a lock-type slide (15) travelling in the surface of the supporting element (10) or in the ring surface (11) of the supporting element (10) with at least one slit-shaped opening (20) for introducing the gripping element support (50) with its end turned away from the tire tread (111) and of at least two slit-shaped openings (20, 20') configured parallel to each other and to the tire tread (111) in the surface of the supporting element (10) or in the ring surface (11) of the supporting element (10) for introducing the gripping element support (50) with its end (50b) turned away from the tire tread (111) so that, for varying the position of the fixing areas (55) of the gripping element supports (50), each gripping element support (50) with its end (50b) in its fixing area (55) takes a position close to the tire tread or far to the tire tread by being inserted into the one slit-shaped opening (20) or the other slit-shaped opening (20').

17. A nonskid device according to claim 11, wherein each gripping element support (50) of the nonskid device (100) is removably connected with the supporting element (10) or with the ring body of the ring-shaped supporting element (10), whereby each gripping element support (50) is fixed in its fixing area (55) by means of a plug connection (60) on a retaining disk (30) placed on the supporting element surface or in the ring surface (11) of the ring-shaped supporting element (10), rotatable about an axis (31) perpendicular to the supporting element surface or to the ring surface (11) of the supporting element (10), the nonskid device (100) being fixed on the wheel or on the wheel rim (120), the retaining disk serving as a bearing for the gripping element supports (50) which shows off-center at least one slit-shaped opening (20) for introducing and fixing the gripping element support (50) with its end (50b) turned away from the tire tread (111) by means of the plug connection (60) so that the fixing area (55) of each gripping element support (50) on the rotatable retaining disk (30) in radial direction to the tire tread (111) for adapting the nonskid device (100) to different tire sizes by rotating each retaining disk (30) the slit-shaped opening 20 is configured variable in its position and takes a position close to the tire tread or a position far to the tire tread.

18. A nonskid device according to claim 11, wherein each gripping element support (50) of the nonskid device (100) is removably connected with the supporting element (10), each gripping element support (50) being fixed in its fixing area (55) by means of a plug connection (60) on the retaining disk (30) placed on in the supporting element surface or on or in the ring surface of the ring-shaped supporting element (10), rotatable around an axle (31) perpendicular to the supporting element surface or to the ring surface (11) of the ring-shaped supporting element (10), when the nonskid device (100) is fixed to the wheel or to the rim (120), the retaining disk showing off-center at least a first slit-shaped opening (20) and in the center a second slit-shaped opening (20'), parallel to the opening (20) placed off-center, for introducing the gripping element support (50) with its end (50b) turned away from the tire tread (111) so that the fixing area (55) of each gripping element support (50) in the first slit-shaped opening (20) of the rotatable retaining disk (30) radially to the tire tread (111) for adapting the nonskid device (100) to different tire sizes by distorting each retaining disk (30) in the supporting element (10) the first slit-shaped opening (20) is configured variable in its position and takes a position close to the tire tread or a position far to the tire tread.

19. A nonskid device according to claim 11, wherein a free end in a slit-shaped opening (20; 20')
a) in a slide (15) or
b) in the surface of the supporting element (10) or
c) in a ring surface (11) of the ring-shaped supporting element (10) or
d) in the rotatable retaining disk (30) surface plane (50b) of each gripping element support (50) shows a Z-shaped profile configuration (52) with a first end section (53) which is bent at a right angle to the linear running section (50c) of the gripping element support (50) and with a second end section (54) which is bent at a right angle to the first end section (53) and parallel to the linear section (50c), whereby the gripping element support (50) is introduced into the slit-shaped opening (20, 20') in its end (50b) tuned to the supporting element (10) between the supporting element (10) and the tire side wall surface (112) in such a way that the second end section (54) of the Z-shaped profile configuration (52) of the end (50b) of the gripping element support (50) rests on the outer wall surface (11a) of the supporting element surface (50) or on the ring surface (11) of the supporting element (10) or on the outer wall surface (30a) of the rotatable retaining disk (30), whereby the gripping element support (50) rests in the transition area of its linear running section (50c) with the first bent end section (53) of the Z-shaped profile configuration (52) of the end (50b) of the gripping element support (50) on the wall surface (11b) of the supporting element (10) which is turned to the border by means of a swelling-type bearing surface (80) which is provided on the wall (20a) limiting the slit-shaped opening (20).

20. A nonskid device according to claim 11, wherein each rotatable retaining disk (30) with the slit-shaped opening (20) or with the slit-shaped openings (20, 20') for supporting the gripping element support (50) with its end (50b) is preferably configured circular and is rotatably held by being press fitted in an opening (18), which is circular, made in the supporting element surface or in the ring surface (11) of the supporting element (10).

21. A nonskid device according to claim 20, wherein the peripheral wall surface (32) of each rotatable retaining disk (30) for the gripping element support (50) is configured as a ring groove (32) which is engaged by the peripheral wall (18a) of the circular opening (18) which receives the retaining disk (30).

22. A nonskid device according to claim 20, wherein each rotatable retaining disk (30) with the gripping element support (50) held by means of the plug connection (60) in a slit-shaped opening (20) of the retaining disk (30) can, when the gripping element support (50) swivels from a radial tire contact position around a middle axle (31) of the pivot bearing (30), which is perpendicular to the retaining disk (30), to a lateral position to a position in which the gripping element support (50) takes the radial contact position on the tire.

23. A nonskid device according to claim 22, wherein the swivelling back of each swivelling retaining disk (30) with its gripping element support (50) about the middle axle (31) of the retaining disk (30) which is perpendicular to the supporting element (10) to the radial tire contact position is effected by an elastic force from the lateral position which is swivelled relative to the middle axle (31) of the retaining disk (30).

24. A nonskid device according to claim 22, wherein, for the swivelling back of each rotatable retaining disk (30) with its gripping element support (50) about a middle axle (31) of the retaining disk (30) which is perpendicular to the supporting element (10) to the radial tire contact position for the gripping element support (50) from the lateral position which is swivelled relative to the middle axle (31) of the retaining disk (30), the opening (18) which receives the retaining disk (30) in the support surface or in the ring surface (11) of the supporting element (10) shows an oval or ellipse-type form and the retaining disk (30) for the gripping element support which is held in the opening (18) shows an oval or an ellipse-type form, whereby the size of the oval or ellipse-type retaining disk (30) is dimensioned, compared with the size of the oval opening or of ellipse-type opening (18), such that the length of the main axis (140) of the retaining disk (30) is smaller than the length of the main axis (40) of the opening (18) in the ring surface (11) of the supporting element (10) and the length of the secondary axis (141) of the retaining disk (30) is less than the length of the secondary axis (41) of the opening (18) or at least the length of the secondary axis (41) of the opening (18).

25. A nonskid device according to claim 19, wherein each slit-shaped opening (20, 20') in the supporting element surface or in the ring surface (11) of the supporting element (10) or in the slide (15) or in longitudinal side edges (21, 22) which limit the rotatable retaining disk (30) for the gripping element support (50) show an arc-shaped wall configuration as swinging aid for swinging each gripping element support (50) closer to the supporting element (10) about a swivelling axis (59) which runs transversely to the longitudinal axis of each gripping element support (50) and for swinging out the gripping element support (50) to a position of use for resting on the tire.

26. A nonskid device according to claim 19, wherein the free end (50b) of each gripping element support (50) which is turned to the supporting element (10) shows two snap-in cams (58, 58') extending on both sides of the longitudinal lateral edges (50d, 50e) of the gripping element support (50), the length from the outer edge (58a) of one snap-in cam (58) to the outer edge (58'a) of the other snap-in cam (58') being dimensioned somewhat bigger than the length of the slit-shaped opening (20; 20') and that the length of the second end section (53) of the Z-shaped profile configuration (52) at the end (50b) of each gripping element support (50) is dimensioned with such a length that, when swinging in the gripping element support (50) to the inner side of the supporting element (10), the free end (50b) of the gripping element support (50) slides on the outer wall surface (30a) of the retaining disk (30) as far as the free end (50b) of the gripping element support (50) comes to rest on the narrow sides (23, 24) of the slit-shaped opening (20, 20') which receives the gripping element support (50) with its snap-in cams (58, 58').

27. A nonskid device according to claim 11, wherein the retaining disk (30) is provided on the wall surface turned to the wheel or to the rim with a recess (70) for receiving the bent sections (53, 54) of the end (50b) of each gripping element support (50) in swung-in position of the gripping element supports of the nonskid device.

28. A nonskid device according to claim 1, wherein the gripping element (50a) of each gripping element support (50) close to or bearing on the tire tread (111) is configured as a fork or is V-shaped and has two legs (250, 251), whereby the longitudinal edges (250a, 251a) of the legs (250, 251) turned to each other run parallel to each other and form a U-shaped gap (255), and wherein the outer longitudinal lateral edges (250b, 251b) of the legs are inclined relative to the axletree (260).

29. A nonskid device according to claim 1, wherein the gripping element (50a) of each gripping element support (50) close to or bearing on the tire tread (111) is configured as a fork or is V-shaped, whereby both legs (250', 251') of the gripping element (50a) are widened so that they are flare-shaped by constituting an approximately V-shaped gap (255') towards the inner side of the wheel so that the legs (250', 251') are inclined to the axletree (260), whereby the outer longitudinal lateral edges (250'b, 251'b) and the inner longitudinal edges (250'1, 251'a) turned to each other are approximately parallel to each other.

30. A nonskid device according to claim 28, wherein the outer longitudinal lateral edges (250'b, 251 'b) of the legs (250, 251) of the gripping element (50a) run parallel to each other or are flare-shaped and that the surfaces of the legs (250, 251; 250', 251') of the gripping element (50a) bearing on the tire tread (111) are provided with contour accentuated profiles (270) in form of crossing profiled webs, spikes (51) being moulded in the respective crossing points of the profiled webs.

31. A nonskid device according to claim 1, wherein pivot bearings are arranged on the supporting element (10) which are designed for the engagement of the respective first ends (50b) of the gripping element supports (50) such that the respective gripping element support (50) is rotatable in a surface plane parallel to the supporting element around the bearing or is swivellable around the bearing by a predetermined angle, whereby the pivot bearing is configured with a removable connection for the gripping element supports (50).

32. A nonskid device according to claim 11, wherein the pivot bearing shows a plug connection (60) and the retaining disk (30) is placed on the supporting element surface or on the ring surface (11) of the supporting element (10) and rotates around an axis of rotation (31) perpendicular to the supporting element surface or to the ring surface (11) of the supporting element (10), whereby the plug connection (60) is connected resistant to rotation with the supporting element (10) and the plug connection shows a slit (20) configured symmetrically to the axis of rotation (31) of the retaining disk (30).

33. A nonskid device according to claim 32, wherein the retaining disk (30) is configured circular or elliptic.

34. A nonskid device according to claim 32, wherein the supporting element (10) shows a circular or an elliptic opening (18) in which the retaining disk (30) is rotatably held by being press-fitted, whereby the retaining disk (30) shows a peripheral ring groove (32) which engages into the opening (18).

35. A nonskid device according to claim 1, wherein a power-exerting device is provided on each bearing for exerting a power thereon so that, by swivelling a respective gripping element support (50) away from a tire contact position around the pivot bearing, the power-exerting device exerts a restoring force in direction of the tire contact position and the power-exerting device comprises at least one spring or an elastic material placed between the pivot bearing and the supporting element (10).

* * * * *